US006552295B2

(12) United States Patent
Markunas et al.

(10) Patent No.: US 6,552,295 B2
(45) Date of Patent: Apr. 22, 2003

(54) PLASMA FURNACE DISPOSAL OF HAZARDOUS WASTES

(75) Inventors: Robert J. Markunas, Chapel Hill, NC (US); John B. Posthill, Chapel Hill, NC (US); Robert C. Hendry, Hillsborough, NC (US); Raymond Thomas, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 09/739,748

(22) Filed: Dec. 20, 2000

(65) Prior Publication Data

US 2002/0040889 A1 Apr. 11, 2002

Related U.S. Application Data

(60) Provisional application No. 60/172,584, filed on Dec. 20, 1999.

(51) Int. Cl.[7] .................................... B23K 10/00

(52) U.S. Cl. .......................... 219/121.36; 219/121.43; 219/121.48; 219/121.59; 588/900; 110/246

(58) Field of Search ...................... 219/121.38, 121.36, 219/121.48, 121.59, 121.44, 121.43; 110/240–256; 588/900, 227, 901, 243; 422/186.21, 186.04, 906, 227, 228

(56) References Cited

U.S. PATENT DOCUMENTS 3,766,866 A 10/1973 Krumm
5,028,452 A 7/1991 Beatty
5,256,854 A 10/1993 Bromberg et al.
5,288,969 A * 2/1994 Wong et al. ........... 219/121.52
5,410,121 A * 4/1995 Schlienger ............. 219/121.43
5,541,386 A * 7/1996 Alvi et al. ............. 219/121.38
5,743,196 A * 4/1998 Beryozkin et al. .......... 110/240
5,779,991 A * 7/1998 Jenkins .................. 422/186.21
5,798,496 A 8/1998 Eckhoff et al.
5,874,014 A 2/1999 Robson et al.
6,187,988 B1 * 2/2001 Cha .......................... 588/227

* cited by examiner

*Primary Examiner*—Mark Paschall
(74) *Attorney, Agent, or Firm*—Oblon, Spivak, McClelland, Maier & Neustadt, P.C.

(57) ABSTRACT

A method and apparatus for plasma waste disposal of hazardous waste material, where the hazardous material is volatilized under vacuum inside a containment chamber to produce a pre-processed gas as input to a plasma furnace including a plasma-forming region in which a plasma-forming magnetic field is produced. The pre-processed gas is passed at low pressure and without circumvention through the plasma-forming region and is directly energized to an inductively coupled plasma state such that hazardous waste reactants included in the pre-processed gas are completely dissociated in transit through the plasma-forming region. Preferably, the plasma-forming region is shaped as a vacuum annulus and is dimensioned such that there is no bypass by which hazardous waste reactants in the pre-processed gas can circumvent the plasma-forming region. The plasma furnace is powered by a high frequency power supply outputting power at a fundamental frequency. The power supply contains parasitic power dissipation mechanisms to prevent non-fundamental, parasitic frequencies from destabilizing the fundamental frequency output power. These power loss mechanisms use either distributed resistance or frequency-selective power-loss devices to prevent parasitic oscillations from instantaneously turning on the high frequency power oscillator at non-fundamental frequencies.

92 Claims, 16 Drawing Sheets

PLASMA FURNACE DISPOSAL OF HAZARDOUS WASTES

This application claims the benefit of Provisional application Ser. No 60/172,584, filed Dec. 20, 1999.

BACKGROUND OF THE INVENTION

1. Field of the Invention

The present invention relates to a method and apparatus for plasma furnace disposal of hazardous wastes.

2. Discussion of the Background

In the field of chemical waste disposal, there are a number of complicating technical and legal requirements which must be managed. For example, as the government designated operational authority in all matters related to chemical weapons disposal, the Army requires that nerve-gas contaminated solid waste material which is disposed from its possession must be certified to have met a 5X standard which requires that the material has been to 540° C. for 15 min. Given that many of neurological bio-hazards, such as sarin are in liquid form, this presents significant complication. For example, processes which might be used on solid waste such as simple closed containment heating to 540° C., if used will create extreme pressures. A container filled with sarin will upon heating become over-pressured once the boiling point 147° C. of sarin is reached. Such an over-pressurized container upon leakage or rupture would disperse its contents rapidly into the surrounding environment. This scenario presents an unacceptable risk to the environment and personnel at disposal sites. In addition to the 5X standard, any effluent discharged from a waste disposal unit must have stack concentrations less than 0.3 ug/m$^3$ of VX, sarin, and mustard gas agents. The public perception is that the effluent must show zero detection of nerve gas agents by best available detection means.

Chemical weapons materials for disposal comes in a variety of forms. In the simplest situation, containers for disposal contain only a nerve gas agent such sarin in liquid form. In practice, containers for disposal contain a wide variety of materials. For example, garments and filters which have been used by personnel in handling sarin containers become themselves laced with sarin. These articles are packed in drums and stored. This material constitutes nerve gas contaminated waste and must be disposed by the Army. Effluent from these drums is no longer pure, rather the effluent will contain significant amounts of water vapor and hydrocarbons. In addition, the articles packed in the drums have a variety of shapes and compositions which presents gas stratification problems with different components volatilizing in the drum at different depths in the drum.

A number of approaches have been developed for disposing of industrial waste products. Incineration is one such approach. Industrial waste products are oxidized into benign exhaustible products as they transit a high temperature combustion flame. U.S. Pat. No. 3,766,866 to Krum teaches a thermal waste converter with primary and secondary chambers for the pyrolysis and combustion of waste material. In a patent which shows the sophistication of incineration techniques, U.S. Pat. No. 5,743,196 to Beryozkin et al. shows a mobile waste incinerator to provide a mobile device for incineration of wastes on site and between sites. Unfortunately, incineration techniques produce considerable exhaust to the atmosphere which poses significant safety concerns given that 100% destruction of the hazardous nerve gas agents may not be certain. Some fraction of the nerve gas agents entrained in the feedstock to the incinerator can by-pass or blow-by of the combustion flame. Typically, this risk is mitigated at permanent facilities by installing multiple burner stages to insure complete incineration of the nerve gas agents. This redundancy adds to the cost of the facility and its operation.

Currently, a $650 million incineration system is being used on site at the Tooele Army Depot in Utah to destroy 27 million pounds of nerve and mustard agents from a variety of munitions stored in nearby bunkers. Despite the remote location, the incineration facility still attracts a significant amount of public scrutiny and watch-dogging. In addition, it is politically unacceptable to permit shipment of loads of nerve gas agents across the country to central disposal facilities. Indeed public law now prohibits transport of nerve gas agents from site-to-site across the United States.

Furthermore, establishing incineration systems at a multitude of storage sites (many which are closer to larger population concentrations) is financially and politically unacceptable. Yet, smaller stores of nerve gas agents are to be found at a variety of sites. Of particular concern, the U.S. Army has identified 224 sites where nerve gas agents have been potentially buried. These sites include 96 locations in 38 states, the District of Columbia and the Virgin Islands. Accidental discoveries of chemical waste material by the public have demonstrated the seriousness of the buried weapons problem. In 1995, workers during construction of a housing development found a chlorine-filled projectile at Fort Lewis in Washington, D.C., and contractors digging utility lines at the Mississippi State Fairgrounds in Jackson uncovered glass vials containing chemical agents. Eventually, more than 260 vials containing phosgene, mustard, and lewisite were found at the Fairgrounds site, only a few blocks from the Mississippi state capitol.

Thus, alternatives to centralized incineration facilities are needed wherein chemical weapons materials can be safely disposed of on-site at the storage sites without transporting those materials to central incineration sites. These alternatives need to process such as nerve gas agents thoroughly and with significant throughput. An estimated 13,000 metric tons of sarin are stockpiled at 9 different storage sites. Compounding this disposal problem is a stockpile of additional containers of sarin-contaminated waste products. These contaminated waste containers include for example, charcoal granules contaminated with varying degrees of sarin. The granules were once exterior protective linings on jump-suits used by workers as they handled the nerve gas agents. The charcoal has been ground into granules and is stored in 55 gallon drums. There are an estimated 250,000 such drums which all must be treated to the 5X standard before they can be disposed. The concentrations of sarin in these drums vary significantly from one drum to another, and in addition many drums are contaminated with water.

Recently, alternatives to combustion-based incinerators have been investigated. U.S. Pat. No. 5,798,496 to Eckhoff et al. teaches a mobile plasma-based waste disposal system which utilizes an arc-torch plasma technology to dispose of industrial waste. U.S. Pat. No. 5,288,969 to Wong et al. teaches an inductively coupled rf plasma torch technology operating at atmospheric pressures for the dissociation of hazardous waste. While these approaches have been shown to be effective in converting toxic agents, they too suffer with similar problems to the combustion processes. Gas by-pass of the plasma regions are possible, and large amounts of effluents or end-products are produced in which a large percentage of this effluent comes from the addition of processing gasses to stabilize the torch operation. Alternatively, U.S. Pat. No. 5,256,854 to Bromberg et. al.

teaches a method and apparatus for simultaneously bombarding toxic gases with high energy electron irradiation and rf inductive fields to destroy vaporized toxic materials. U.S. Pat. No. 5,028,452 to Beatty teaches a closed-loop low-pressure system and process for conversion of gaseous or vaporizable organic and/or organo-metallic compounds to an inert solid matrix resistant to solvent extraction. U.S. Pat. No. 5,779,991 to Jenkins teaches an apparatus for destroying hazardous compounds in a gas stream using a cylindrical labyrinth passage wherein a plurality of electric fields are used for generating and sustaining a plasma or corona discharge through different zones within the gas labyrinth. These systems use low power operations to convert the waste gas stream into more benign end-products. Unfortunately, the low power level limits the quantity of hazardous waste products which can be converted on a single pass.

In particular, every broken bond in the gas phase requires a fixed number of joules for dissociation. Thus, a given throughput of molecules will require at least a given amount of energy to dissociate all the molecular bonds. Due to inefficiencies in the process, this given amount of energy represents a minimum amount of energy which must be supplied. Simple calculations show that dissociation of one liter of nerve gas agent requires about 17 kW-hrs of energy. One can see from the calculation that low-power, glow-discharge plasma systems typically 100–3000 W are limited in the quantity of nerve gas agent which can be throughput. (PlasmaTek Labs, Inc., Watsonville, Calif.).

Input power to glow discharge systems can not be raised to high power levels. Glow discharge systems have inherent limitations which restrict operation at higher powers. It is well known that, even at radio frequency operations, a dc bias appears across electrodes in contact with a plasma. This dc bias is separated from the electrodes by a “dark space” in which relatively little charge exists. As the power level increases, the dc bias level increases until a level is reached where the dark space can no longer support the potential. An electrical break down (arcing) occurs. Continued operation in this mode significantly degrades the electrode material. An example of this process is cathodic are deposition in which arcing is deliberately induced at a surface to vaporize and ionize the target material. In this case, the electrode material (i.e. the target) is consumed in the coating process. The vaporized material can then be used to coat a substrate. Systems are commercially available which utilize this technique for coatings deposition. (UES, Inc., Dayton, Ohio).

For a fixed power level, the dc bias level will decrease at higher operating frequencies. Microwave plasmas have been used to dissipate high powers (75 kW) into plasmas. (ASTeX, Inc., Woburn, Mass.). However, this approach suffers from severe plasma non-uniformities. The plasmas typically form with spherical or elongated-spherical shapes and occupy distinctive positions in the plasma chamber. As a result, the microwave plasma does not exist throughout the volume of the chamber. Rather, at microwave frequencies the plasma chamber is a resonant cavity with the plasma occupying those areas in the chamber where the electric field strength is high enough to self-ionize the gas. Regions in the resonant cavity with insufficient field strength have no plasma. Thus, gas bypass becomes a serious concern and must be handled by re-circulation or a series of microwave plasma processing stations.

Likewise, arc plasma torches and rf induction plasmas which have the requisite power dissipation to handle significant amounts of nerve gas agent have arc and toroidal plasma sources, respectively, which pose problems for complete introduction of gas into the plasma arc or toroid. Further, for reasons of plasma stability, these systems operate at high pressures, typically 70 Torr to 760 Torr. At these pressures, the gasses which are superheated by the arc or toroidal plasma source have enough heat capacity that contact of these hot gasses with the chamber walls will result in wall failure and loss of containment. In atmospheric rf induction torches, sheath gasses which stream along the tube walls and which do not become superheated have been used to successfully protect the equipment walls. Unfortunately, these sheath gas stream paths represent gas paths by which sarin and other nerve gas agents can circumvent the plasma and not be thoroughly reacted.

Thus, two constraints have limited the development of plasma based tools for chemical and biological waste disposal. Glow discharge plasma systems which have diffuse uniform plasmas operate at low power and power densities and consequently suffer from incomplete reactant conversion, as every bond broken in the gas phase requires a requisite number of joules to dissociate for disocaition. Furthermore, glow discharge plasma systems have inherent limitations related to self bias which prevent operating at higher power levels. On the other hand, arc-torches, microwave plasmas, and rf plasma torches which operate with high power and power densities capable of processing significant quantities of nerve gas agent have non-uniform plasmas in which the plasma is segregated into compact shapes which occupy only a fraction of the chamber volume and gas flow path.

Problems of incomplete conversion and system blow-by require system redundancies and recycling to maintain adequate safety precautions. These solutions add considerable cost and complexity to the facility and operational cost. Better plasma waste disposal systems are needed especially in applications involving extremely toxic nerve gas agents where system failures can lead to potentially catastrophic releases of nerve gas agent into the surrounding environment. These systems must operate at high power levels sufficient to enable high throughput of nerve gas agents.

Robson et al. (U.S. Pat. No. 5,874,014) teaches hazardous waste destruction in a high-power, low-pressure rf induction tool. This tool generates a large-area high-frequency rf induction plasma. However, experimentation by the present inventors has shown that the performance of the tool as described by Robson et.al. (U.S. Pat. No. 5,874,014) for processing of chemical waste is limited, particularly in regard to conversion efficiency. The presence of gas by-pass paths and comers in the Robson et al. plasma chamber design severely restricts the amount of a reactant gas which can be throughput without detection of the reactant gas in an output gas stream from the rf induction tool.

SUMMARY OF THE INVENTION

Accordingly, one object of the invention is to provide a new and improved method and apparatus for plasma disposal of hazardous waste which reliably and safely completely alters the chemical composition of hazardous waste to chemical by-products which are either harmless or can be subsequently disposed of or further treated conventionally.

Another object of this invention is to provide a method and apparatus to convert with high efficiency and high throughput hazardous waste into by-products.

Still a further object of this invention is to provide a hazardous waste disposal method and apparatus which can be self-contained and portable.

Another object of this invention is to convert the hazardous waste into chemical by-products yielding a minium amount of residual by-products.

Yet, another object of the invention is to provide a rf power supply tolerant of dynamic load changes presented by a plasma in the apparatus for plasma disposal such that parasitic energies in the rf power supply do not destabilize the rf power supply.

These and other objects are achieved according to the present invention by providing a novel method and apparatus for plasma waste disposal of hazardous waste material, where the hazardous material is volatilized under vacuum inside a containment chamber to produce a pre-processed gas as input to a plasma furnace including a plasma-forming region in which a plasma-forming magnetic field is produced. The pre-processed gas is passed at low pressure and without circumvention through the plasma-forming region and is directly energized to an inductively coupled plasma state such that hazardous waste reactants included in the pre-processed gas are completely dissociated in transit through the plasma-forming region. Preferably, the plasma-forming region is shaped as a vacuum annulus and is dimensioned such that there is no bypass by which hazardous waste reactants in the pre-processed gas can circumvent the plasma-forming region. The plasma furnace is powered by a high frequency power supply outputting power at a fundamental frequency. The power supply contains parasitic power dissipation mechanisms to prevent non-fundamental, parasitic frequencies from destabilizing the fundamental frequency output power. These power loss mechanisms use either distributed resistance or frequency-selective power-loss devices to prevent parasitic oscillations from instantaneously turning on the high frequency power oscillator at non-fundamental frequencies.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
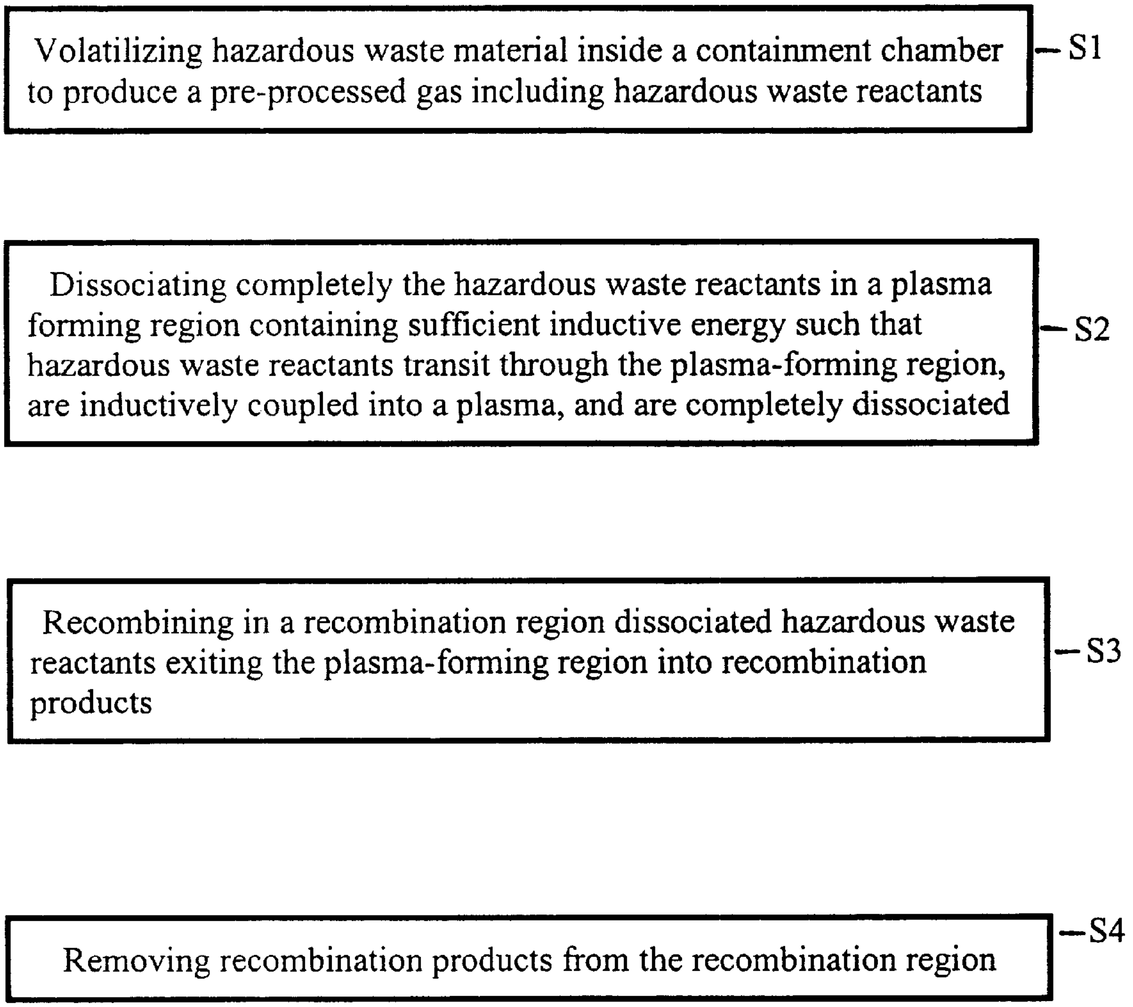
FIG. 1 is a flow chart showing the method of the plasma waste disposal.

Referring now to the drawings, wherein like reference numerals designate identical or corresponding parts throughout the several views, and more particularly to FIG. 1 thereof, is a flow chart showing the method of the plasma waste disposal. The method comprises the steps of: volatilizing in S1 at sub-atmospheric pressure hazardous waste material in a containment chamber to produce a pre-processed gas including hazardous waste reactants; dissociating completely in S2 the hazardous waste reactants from the containment chamber in a plasma-forming region containing sufficient inductive energy such that said hazardous waste reactants transit through the plasma-forming region, are inductively coupled into a plasma having a magnetic skin depth, and are completely dissociated; recombining in S3 in a recombination region dissociated hazardous waste reactants exiting the plasma-forming region as recombination products, and removing in S4 recombination products from said recombination region.

In this method, hazardous waste materials in a variety of forms contaminated with a variety of hazardous waste reactants can be disposed. Hazardous waste such as nerve gas agent can be processed to met the 5X standard which requires all material contaminated with sarin to be heated to 540° C. for 15 min in order to be certified for disposal from repository sites. In this method, vacuum processing enables the hazardous waste materials in the containment chamber to be safely volatilized without fear of explosive pressure buildup. Vacuum processing in the plasma furnace restricts downstream chemistry of dissociated reactant species. Furthermore, vacuum processing adds an additional safety margin wherein any leaks in the plasma furnace result in outside air leaking into the plasma furnace, and not hazardous waste reactants leaking outward into the environment.

Figure 2:
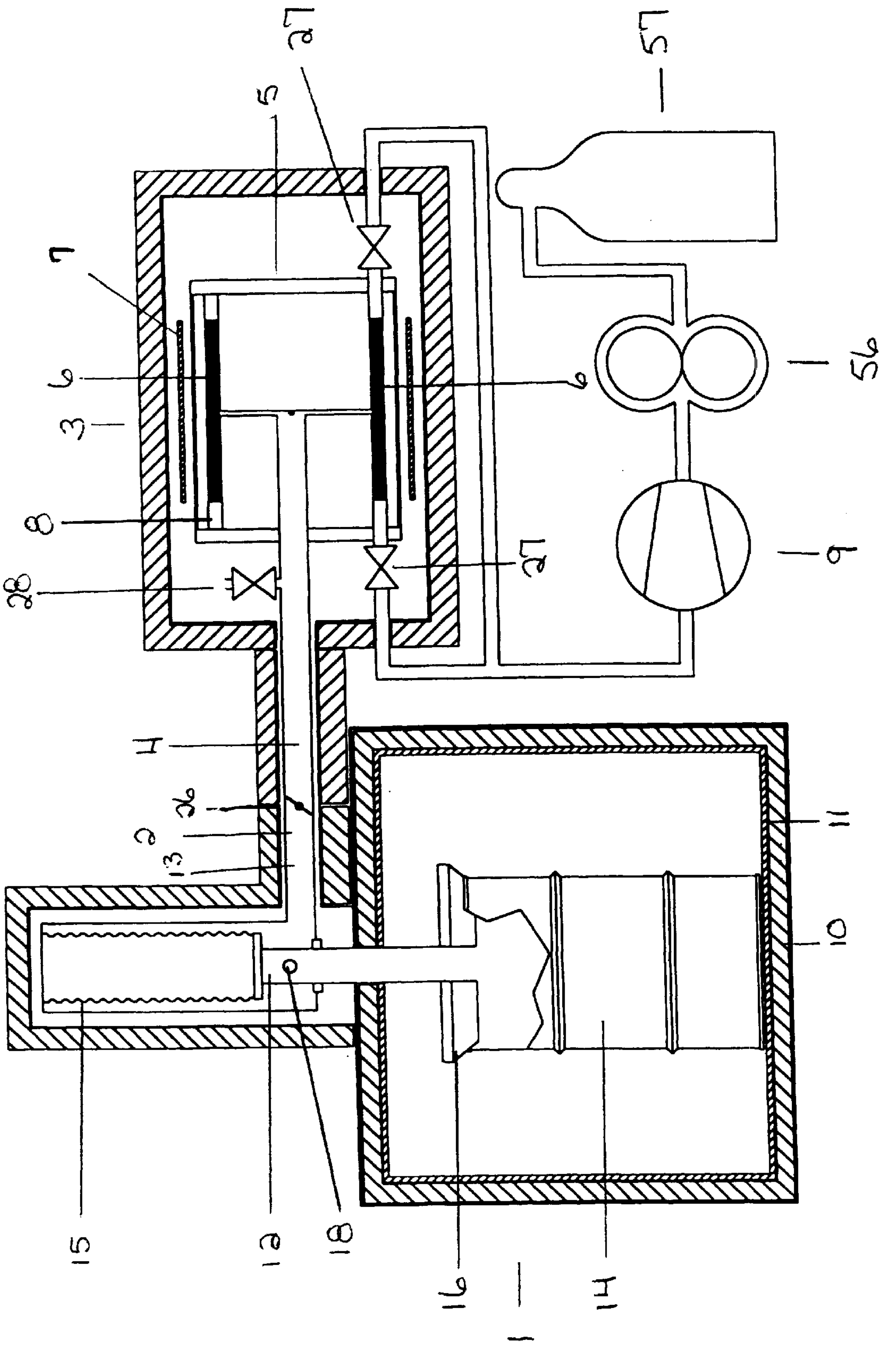
FIG. 2 is a schematic diagram showing the apparatus of the present invention for plasma disposal of hazardous waste depicting the containment chamber, the plasma furnace, and the capture facility.

FIG. 2 is a schematic diagram showing an apparatus of the present invention for plasma disposal of hazardous waste. A containment chamber 1 volatilizes under vacuum the hazardous waste material hence providing the pre-processed gas including the hazardous waste reactants to a containment chamber outlet 2. The pre-processed gas is introduced into a plasma furnace 3 through a plasma furnace inlet 4 coupled to the containment chamber outlet 2. The plasma furnace 3 coupled to the plasma furnace inlet contains a plasma chamber 5 including a plasma-forming region 6 in which a plasma-forming magnetic field is produced. Pre-processed gas is passed through and without circumvention of the plasma-forming region and is directly energized to the inductively coupled plasma state. An rf power supply (not shown in FIG. 2) including an rf applicator 7 produces a plasma-forming magnetic field of sufficient inductive energy in the plasma-forming region 6 such that hazardous waste reactants during transit through the plasma-forming region are completely dissociated. A recombination region 8 exists adjacent to the plasma-forming region wherein dissociated reactants recombine to form recombination products which are pumped from the plasma furnace. And, a vacuum pump 9 coupled to the recombination region maintains a sub-atmospheric pressure in the plasma furnace.

I. The Containment Chamber

Figure 3:
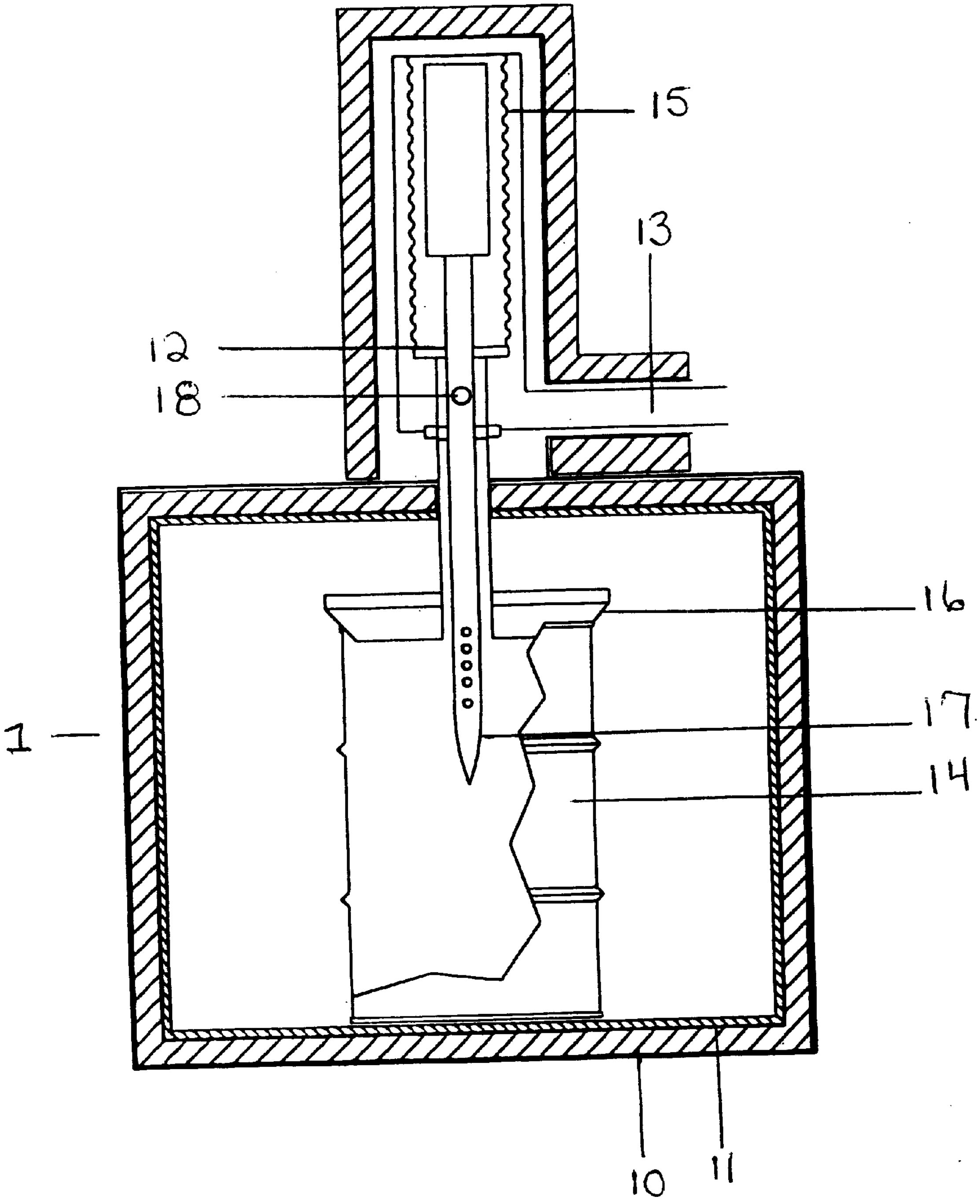
FIG. 3 is a schematic diagram of the containment chamber with the penetrating device used to collect gas effluent from 55 gal storage drums.

FIG. 3 is a schematic diagram of the containment chamber 1. The containment chamber 1 is a sealed chamber wherein hazardous waste material such as nerve gas agents, existing as liquids or condensate, or objects contaminated with hazardous waste reactants can be placed and controllably heated under vacuum conditions to volatilize the hazardous waste materials, thus providing the pre-processed gas as effluent from the containment chamber. The containment chamber 1 includes a containment wall 10, a heating mechanism 11, a penetration device 12, and an effluent pipe 13. The containment wall 10 is configured to seal the containment chamber from atmosphere permitting operation at sub-atmospheric pressures, insuring that nerve gas effluent will not transgress into the environment surrounding the plasma furnace. The heating mechanism 11 is configured to heat the containment chamber to 540° C., necessary to meet the 5X disposal requirement. Heaters ramp the temperature on demand as necessary to maintain a supply of pre-processed gas to the plasma furnace. Evaporation and sublimation rates of the contents in the containment chamber provide a sub-atmospheric pressure of pre-processed gas to the plasma furnace. For example, as a liquid source of nerve gas agent is vaporizing, power to the electrical heaters maintains the vaporization rate necessary to supply a given flowrate of pre-processed gas to the plasma furnace. Otherwise, the liquid source would freeze due to evaporative cooling. Once a particular liquid source is depleted (as indicated by a dropping supply pressure or flowrate), the temperature of the containment chamber is ramped closer to 540° C. In this manner, contents of the containment chamber can be controllably raised to the 5X temperature standard without creating a supra-atmospheric containment chamber. Some materials such as the charcoal filters will not be volatilized by the bake to 540° C. and will remain in the original drum. Those materials which remain in the containment chamber after the bake to 540° C. are now 5X certified and can be shipped to proper disposal facilities. The penetration device 12 is configured to sample gas from various depths inside a storage container 14 residing inside the containment chamber 1.

As previously mentioned, the hazardous waste material may contain objects contaminated with nerve gas or other agents. These objects can be located at different depths in a storage container residing in the containment chamber. This variety of objects at different depths presents stratification problems should the effluent be simply pumped from the top of the storage container. To avoid this problem, the penetration device 12, as shown in FIG. 3, is used to collect vapor effluent from the storage container at different depths within the storage container 14. The penetration device 12 includes a penetrator actuator 15 for translating a tapered flange 16 and a piercing tube 17 with hole perforations along the length of the piercing tube. The penetration device 12 is designed but not limited to interface to a lid of a standard 55 gallon drum 14 using the tapered flange 16. The piercing tube 17 penetrates into the contents of the 55 gallon drum 14. Such an arrangement enables the vapor effluent to be collected at various depths of the 55 gallon drum 14, preventing stratification of any effluent inside the 55 gallon drum. The penetrating device connects through an orifice 18 to the effluent pipe 13 to the plasma furnace.

Storage containers which simply contain liquid sources may or may not use the penetrating device.

Multiple containment chambers may be used in the present invention to supply pre-processed gas to the plasma furnace. The multiple containment chambers are connected such that, as one drum within a particular containment chamber is depleted of hazardous waste reactant, another drum with hazardous waste reactant is available to supply reactant forthwith. Each containment chamber is heated to 540° C. in controlled manner determined by the sub-atmospheric pressure created in the containment chamber by the vaporizing hazardous waste material.

Besides nerve gas agents, materials such as dioxan, furan, and polychlorinated biphenyls (PCB) contaminated fluids could be supplied from the containment chamber to the plasma furnace. Destruction of these chemicals would be accomplished under conditions similar to those used for the destruction of nerve gas agents.

Effluent from steam autoclaves used in the medical industry for sterilization might also be subsequently treated by the plasma furnace of the present invention. Destruction of this effluent would be accomplished under conditions similar to those used for the destruction of nerve gas agents.

II. Plasma Furnace

Figure 4:
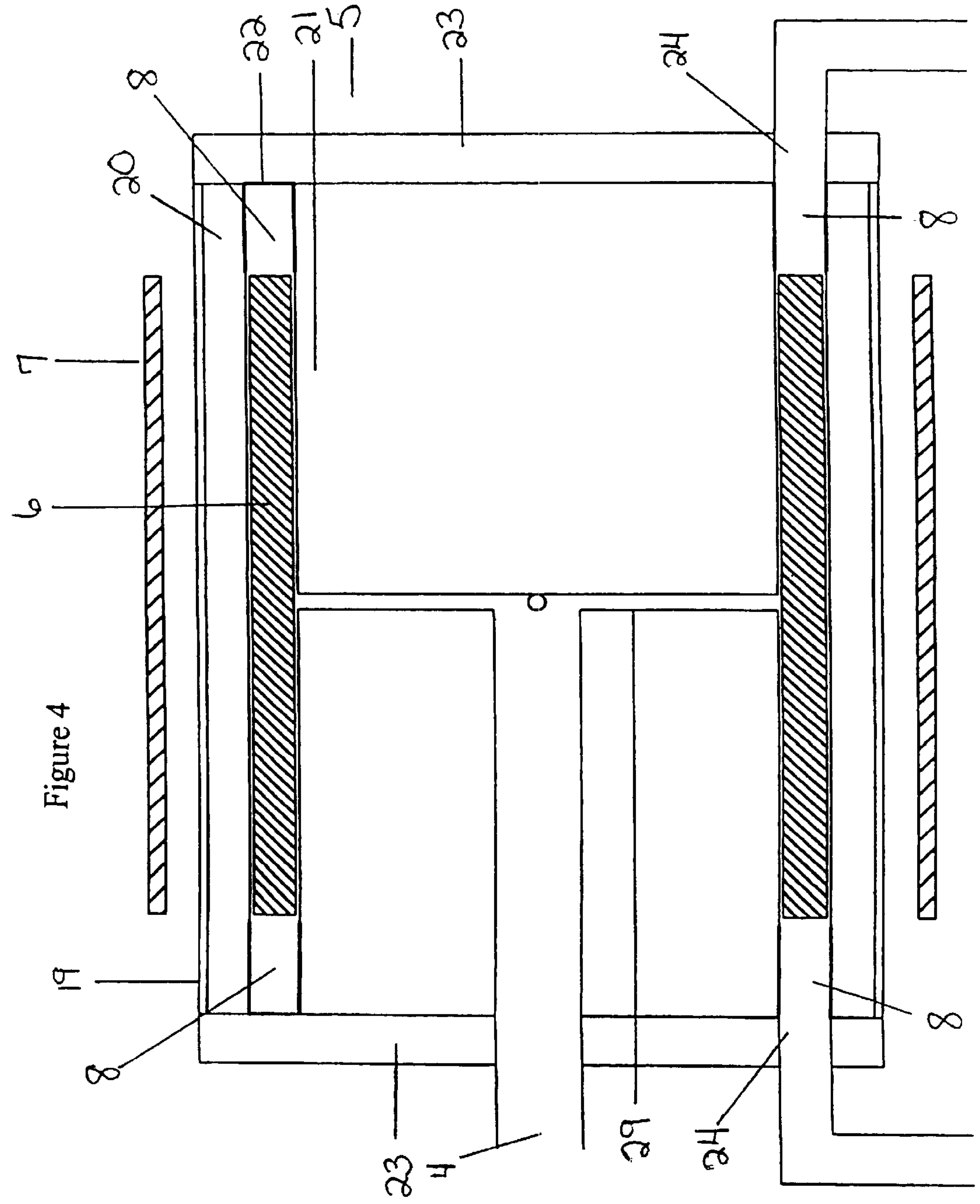
FIG. 4 is a schematic diagram of the plasma chamber of the present invention with a confined discharge zone showing the gaseous reactant inflow path and central injection into the confined discharge zone.
Figure 5:
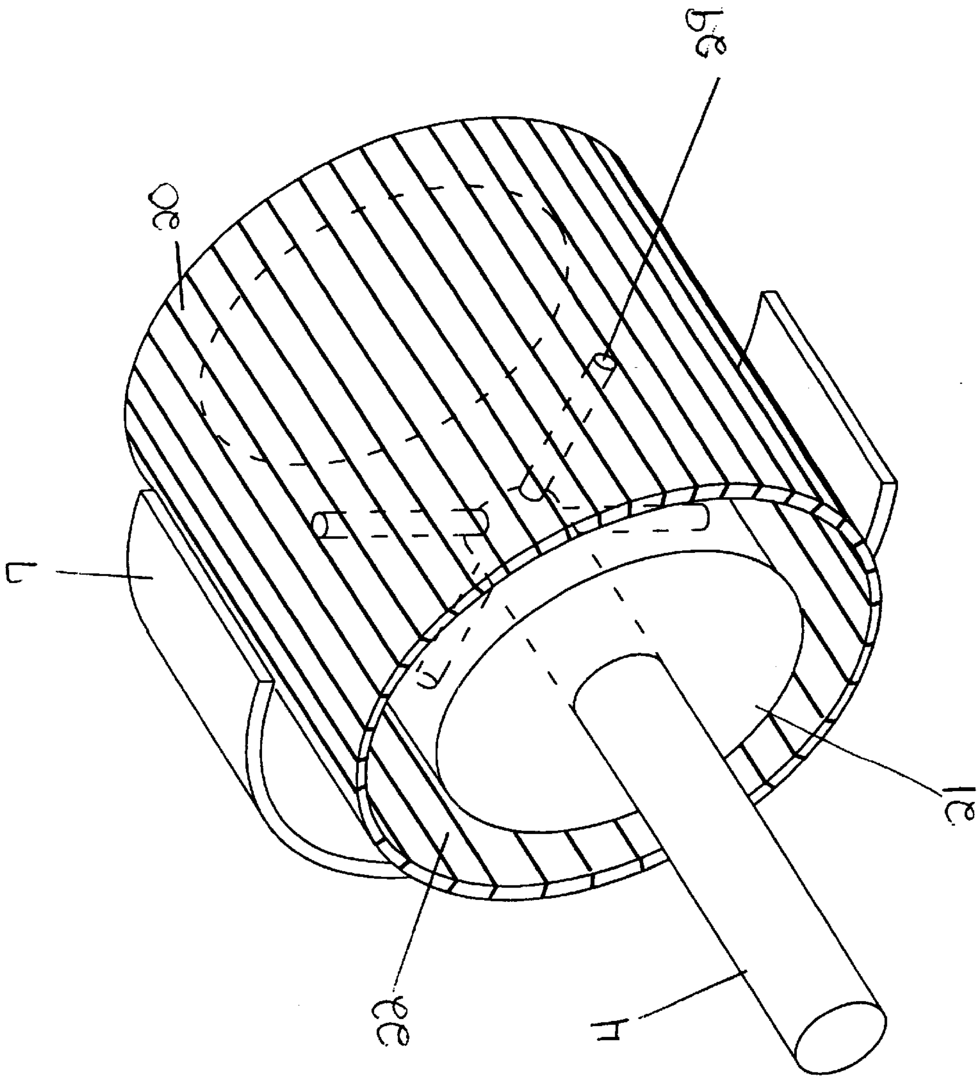
FIG. 5 is a perspective view of some elements of the plasma chamber showing the cylindrical construction.

FIG. 4 is a schematic diagram of the plasma chamber 5 showing its relation to the rf applicator 7. FIG. 5 shows a perspective view of some elements of the plasma chamber 5. In one embodiment of the plasma chamber, the plasma chamber includes a dielectric cylindrical sleeve 19, a slotted metal bar array 20, a cylindrical metal plug 21, a vacuum annulus 22, and end caps 23. The dielectric cylindrical sleeve 19 forms an outside vacuum boundary for the plasma chamber 5. The slotted metal bar array 20 is coaxially disposed inside the dielectric cylindrical sleeve 19 and is configured to support a vacuum force on the dielectric cylindrical sleeve 19 and to block electric field components on the rf applicator 7 from while coupling magnetic field components on the rf applicator into the plasma-forming region 6. The cylindrical metal plug 21 is concentric to the dielectric cylindrical sleeve 19 and the slotted metal bar array 20 and is configured to inject the pre-processed gas into a central portion of the plasma-forming region 6. The vacuum annulus 22 is formed between the slotted metal bar array 20 and the cylindrical metal plug 21. The plasma forming region 6 is confined inside the vacuum annulus. Outside the plasma-forming region 6, there exists a recombination region 8. Due to the active dissociation in the inductively coupled plasma region, recombination of atomic species into molecular species is realized immediately outside the inductively coupled plasma region in the recombination region 8 where recombination products are formed. Dissociated reactants thermalize on the walls of the recombination region 8 and convert to simple, stable recombination products. End caps 23 existing on opposite ends of the slotted metal bar array 20 and the cylindrical metal plug 21 are configured to provide a vacuum seal and at least one gas passage exit 24 from the plasma chamber 5. The slotted metal bar array 20 and the cylindrical metal plug 21 have interior cooling fluid passages (not shown here) to provide cooling against heat flux from the plasma.

Slots in the slotted metal bar array 20 are filed with a dielectric material to prevent gas flow through the slots. Pre-processed gas upon injection encounters the plasma-forming region 6, and gas including said dissociated hazardous waste reactants flows along the vacuum annulus 22 and through gas passage exits 24 on both end caps 23. In this embodiment, a radial distance or a radial dimension between an interior surface of the slotted metal bar array 20 and an exterior surface of the cylindrical metal plug 21 is set comparable to a total distance of a plasma depth and a diffusion length of the hazardous waste reactant for a time of transit through the plasma-forming region.

Figure 6:
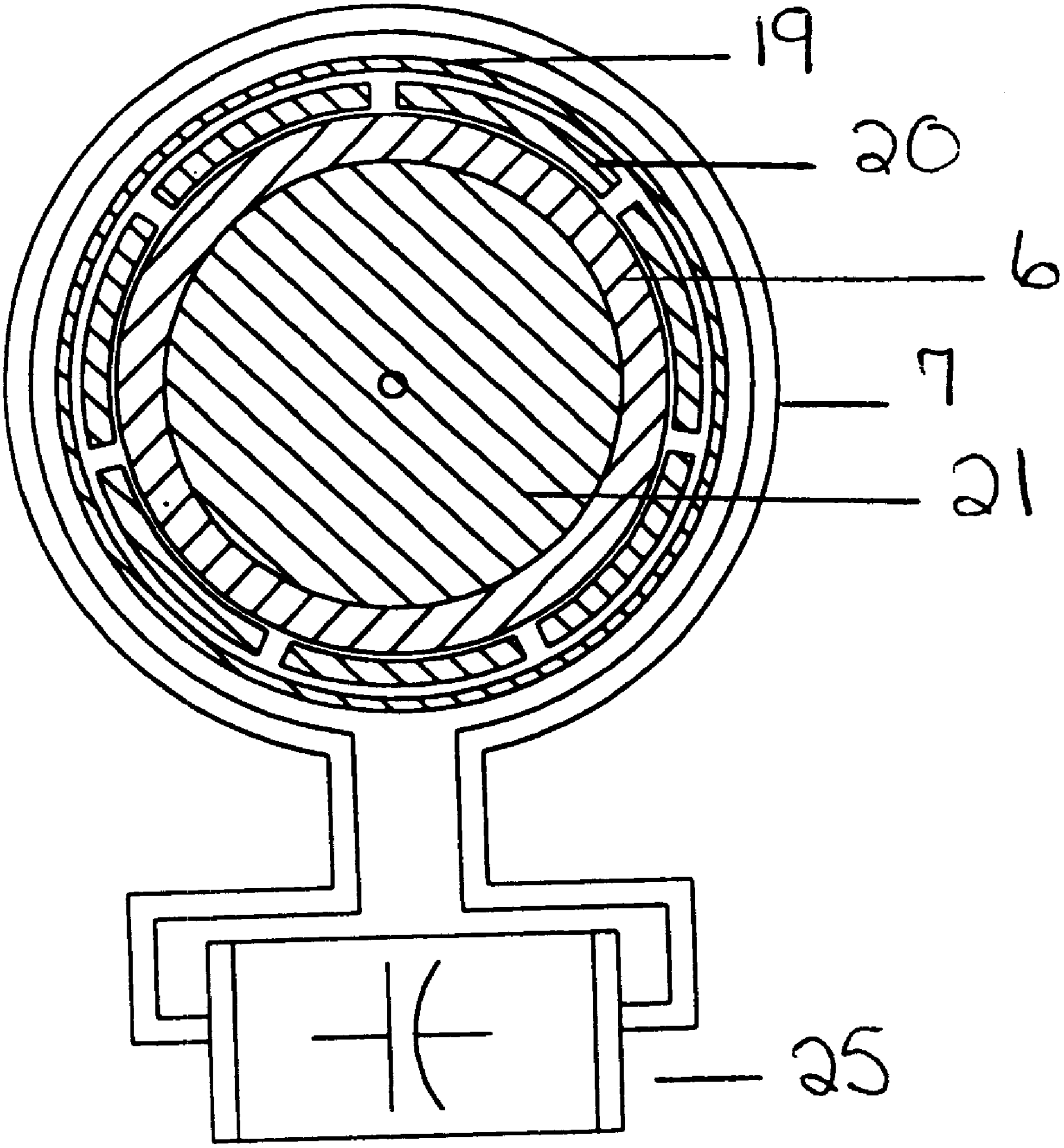
FIG. 6 is an axial cross-sectional view of the plasma chamber of the present invention.

FIG. 6 shows an axial cross-sectional view of the plasma chamber showing a resonating tank capacitor 25. Currents on the rf applicator 7 induce currents in a magnetic skin depth of the induced plasma. The plasma depth is a radial distance of the plasma-forming region whereby electrons energized in the magnetic skin depth of the inductively coupled plasma penetrate before recombining with ions, ionizing neutral molecules, dissociating molecules, or thermalizing. The magnetic skin depth defines a region in the plasma where the majority of the incident rf energy is coupled and the majority of the electrons are produced by the plasma-forming magnetic field. Electrons within the magnetic skin depth are accelerated by the plasma-forming magnetic field and penetrate into the interior of the plasma where they can recombine with ions or initiate chemical reactions. Electrons which diffuse to the walls typically recombine with ions there and are lost from the process. Examples of magnetic skin depths calculated for a hydrogen plasma operating at 12.7 MHz and 25 kW are 0.69 cm at 0.50 Torr and 1.7 cm at 2.0 Torr.

Unexpectedly, tests have shown that conditions at low pressure (i.e., 0.28 Torr) and smaller magnetic skin depths provided better conversion of pre-processed gas species than conditions at high pressure (i.e., 2.0 Torr) and a larger magnetic skin depths. The reason for the more effective conversion at the lower pressure is that the lower pressure results in higher electron densities and energies. These higher energy electrons penetrate further from the magnetic skin depth. As a result the plasma extends radially inward and occupies a larger cross-sectional area of the vacuum annulus. The plasma depth can be observed from the profile of visible light emission from an inductively coupled plasma along the cross-sectional view as shown in FIG. 6. At a given pressure, the plasma-forming region extends from the slotted metal bar array radially inwardly a given distance, the plasma depth, and an abrupt drop in plasma luminosity can be seen beyond this distance. As pressure increases, the plasma depth decreases, and the plasma forming region is seen to exist closer to the slotted metal bar array. Conversely, as pressure decreases, the plasma depth increases, and the plasma forming region is seen to extend further from the slotted metal bar array until the entire cross-section is filled with plasma.

Pressure effects both the electron mean free path and the magnetic skin depth. As the pressure rises above 2–3 Torr, electron-ion recombination starts to dominate as the electron loss mechanism. The electrons may be lost to recombination with ions from within the plasma before they have chance to dissociate hazardous waste reactants. At pressures above ~2 Torr, it is essential to restrict gas flow such that it does not by-pass the plasma forming region by flowing into a central region of the plasma chamber where lower electron densities and energies exist. One way to restrict the gas flow is to block the central axis of the flow tube with the cylindrical metal plug 21 and force the gas through the vacuum annulus 22. The cylindrical metal plug 21 serves to restrict gas flow to a region proximate to or in the plasma-forming region 6. Higher conversion efficiencies may be realized by utilizing a part of the plasma-forming region closer to the slotted metal bar array 20.

The diffusion length for a time of transit through the plasma-forming region is given according to the length of said plasma-forming region and a given pressure, flowrate, gas temperature, and diffusion coefficient of hazardous waste reactant in the plasma-forming region. Calculations of diffusion lengths are given in standard treatises (see O'Hanlon, J. F. *A User's Guide to Vacuum Technology.* N.Y., John Wiley and Sons, 1980. p 17–20. TJ 940.037). Electrons and small radical species have a much higher diffusion rate than more complex molecules such as sarin. For given flow rate and pressure it will take a molecule of sarin, for example, with a diffusivity $D_s$, a certain amount of time $\tau$ to traverse the plasma zone. Higher flow rates will reduce that time while higher-pressures will increase the transit time. During that transit time, the sarin molecules must encounter a reactive radical or an electron of sufficient energy to dissociate the sarin. The diffusion length $D_l$ is given by:

$$D_l = \sqrt{2 \cdot D_s \cdot \tau} \quad (1)$$

Equation (2) shows a relationship between the radial distance d and the plasma depth s and the hazardous waste reactant diffusion length $D_l$ to insure that hazardous waste reactants transiting the vacuum annulus 22 encounter the inductively coupled plasma.

$$d \leqq D_l + s \quad (2)$$

where d is the radial distance, s is the plasma depth, and $D_l$ is the diffusion length of a given hazardous waste reactant at a given pressure, flowrate, and temperature in the vacuum annulus. As can be seen from equation (2), design of a vacuum annulus with a proper radial distance depends on the intended operating conditions. The radial distance is a critical part of the present invention. Thus, the radial distance should be set to no more than the total distance of a plasma depth and a diffusion length of the hazardous waste reactant.

Alternatively, the radial distance or a radial dimension between an interior surface of the slotted metal bar array 20 and an exterior surface of the cylindrical metal plug 21 can be set comparable to a distance of the plasma depth. In this case, hazardous waste reactants enter a vacuum annulus filled with plasma, and diffusion of the hazardous waste reactant to the plasma-forming region is not required for dissociation of the hazardous waste reactant.

Operating conditions such as pressure and flowrate are established by gas handling equipment which meters gas from the containment chamber through a flow control valve 26 and controls the pressure inside the plasma furnace through pressure control valves 27 and a vacuum pump 9.

Sub-atmospheric pressure in the containment chamber and in the plasma chamber is monitored by standard pressure gauges (not-shown) such a capacitance manometer. Valve 28 is provided to evacuate the surrounding area of the plasma chamber to provide an additional safety feature should for any reason the plasma furnace become contaminated and require exhausting. In this manner, hazardous waste reactants existing in the surrounding area of the plasma chamber can be processed through the plasma furnace. The plasma chamber 5 operates at sub-atmospheric pressure and is sealed by the dielectric cylindrical sleeve 19 and the end caps 23. Gas exits the vacuum annulus 22 through gas passage exits or openings 24 in the end caps. These openings set pumping uniformity and flow of the pre-processed gas and the resultant recombination products in the plasma furnace.

FIGS. 4 and 5 also show a preferred embodiment wherein there are a series of radial drilled passages 29 in the cylindrical metal plug 21 to inject the pre-processed gas into the plasma-forming region 6. The inductively coupled plasma in the plasma-forming region 6 surrounds the drilled passages 29 and allows no path for gaseous circumvention. Nerve gas agents upon introduction into the plasma-forming region of the plasma are dissociated bythe inductively coupled plasma. The dissociated products are then pumped (as shown in FIG. 4) bi-directionally along the length of the vacuum annulus 22 and subsequently recombine into the recombination products primarily in the recombination region 8.

For any given dissociated reactants exiting the plasma, the first interception of the dissociated reactants with the water-cooled walls will serve to thermalize or quench the reactant. All of the dissociated reactants exiting the plasma are expected to have relativity low molecular weights and thus diffusion constants higher than the hazardous waste reactants. By providing more opportunities to effect collisions with the walls of the recombination region 8, the recombination product rate can be enhanced. This enhancement may be accomplished in several ways. The cylindrical metal plug may extend downstream from the plasma-forming region 6 to provide cold surfaces (relative to the plasma temperature) upon which recombination can occur. The plasma chamber walls can be aggressively cooled to lower the gas temperature as quickly as possible. Convolutions in the plasma chamber surface and cylindrical plug surface may be introduced to increase the chamber wall area.

Furthermore, wall coatings such as sprayed ceramic coatings or plasma-sprayed metal coatings may be added to the cylindrical metal plug to enhance the formation of recombination products. Even a glass or ceramic plug could be used instead of a metal plug.

The recombination products are pumped onward through the pressure control valves 27 and exit the plasma furnace 3 to the vacuum pump 9.

Figure 7:
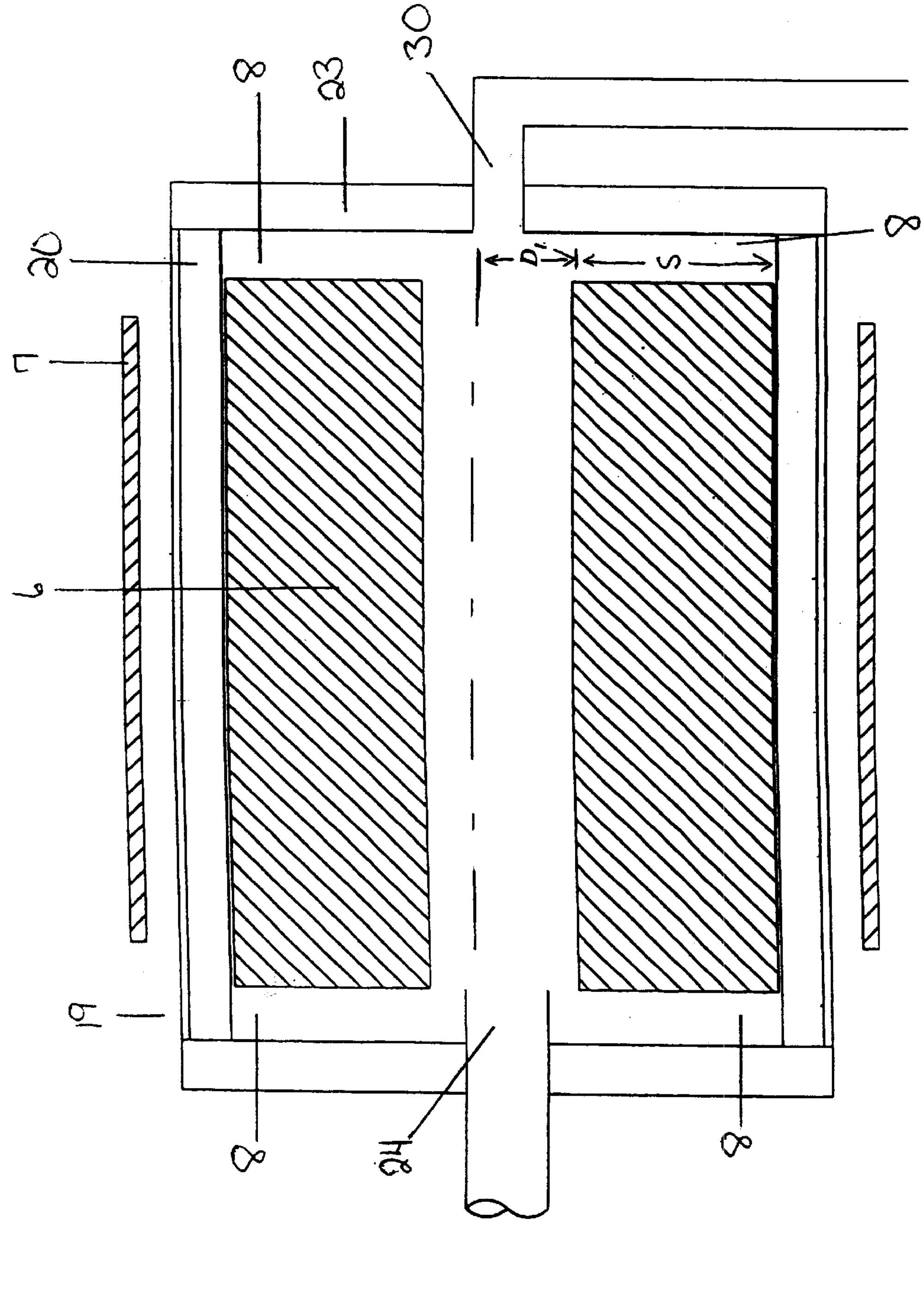
FIG. 7 is a schematic diagram of another embodiment of the present invention wherein the cylindrical metal pug is not utilized.

In another embodiment of the plasma chamber, the cylindrical metal plug is omitted. The plasma chamber includes only the dielectric cylindrical sleeve 19, the slotted metal bar array 20, and the end caps 23. FIG. 7 shows this plasma chamber embodiment. In this embodiment, a plasma-forming region 6 exists within a cylindrical space interior to the slotted metal bar array. Slots in the slotted metal bar array are filed with a dielectric material to prevent gas flow through the slots. Pre-processed gas is injected through a gas entrance 30 on one end cap and flows along the cylindrical space interior to the slotted metal bar array where hazardous waste reactants are dissociated by the inductively coupled plasma. The dissociated products exit to the recombination region where they recombine to form recombination products and then exit via at least one gas passage opening 24 at an opposite end cap. In this embodiment, an inside diameter of the slotted metal bar array 20 is set comparable to twice a total distance of the plasma depth and a diffusion length for a time of transit through the plasma-forming region.

Alternatively, the inside diameter of the slotted metal bar array 20 can be set comparable to a distance of twice the plasma depth.

Figure 8:
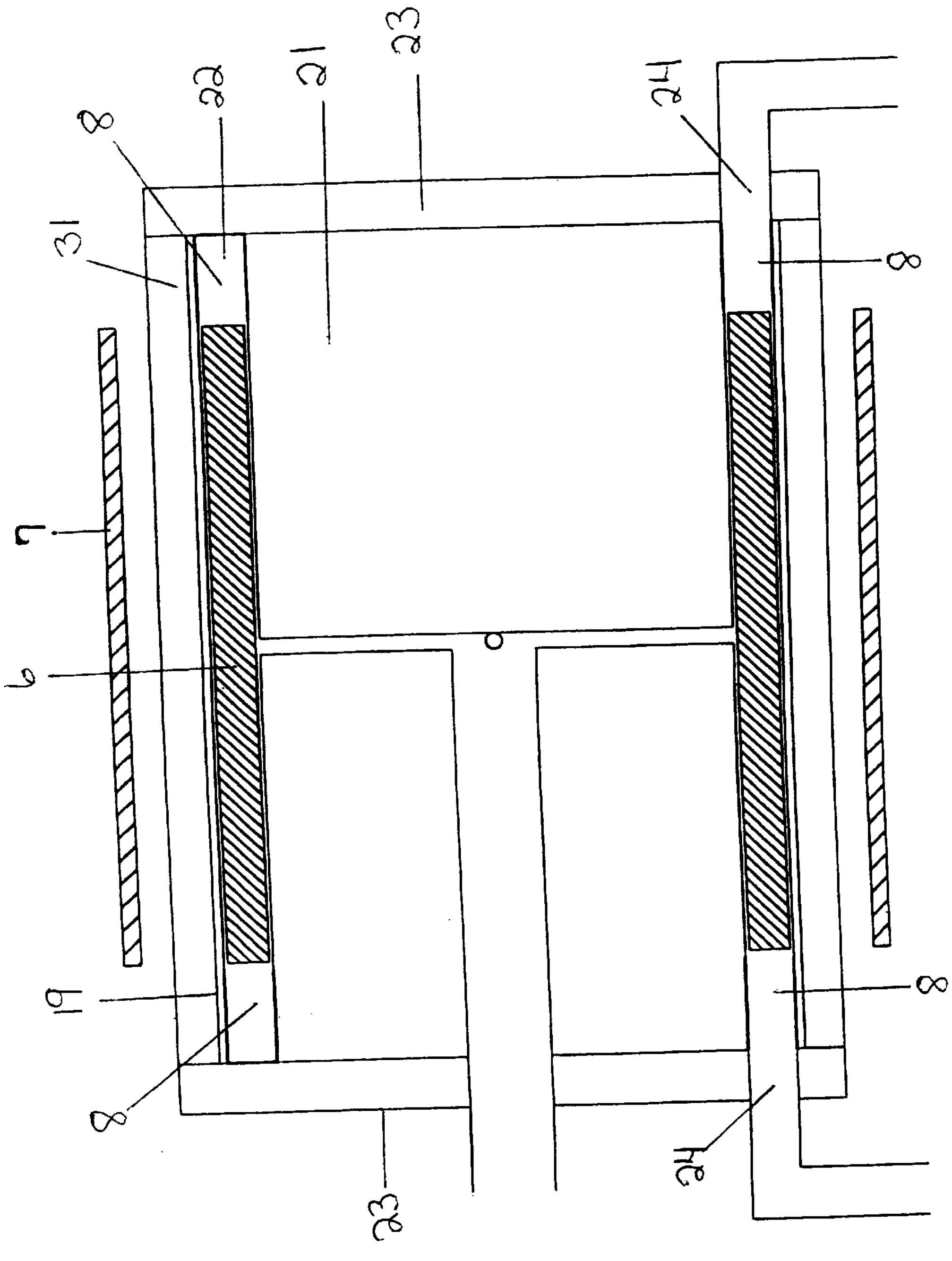
FIG. 8 is a schematic diagram of another embodiment of the present invention wherein the slotted electrostatic shield exists outside the dielectric sleeve.

In another embodiment of the plasma chamber, the plasma chamber comprises the dielectric cylindrical sleeve. 19 which constitutes the outside vacuum boundary, the cylindrical metal plug 21 disposed inside the dielectric cylindrical sleeve 19 and configured to inject pre-processed gas into a central portion of the plasma-forming region 6, and the end caps 23. FIG. 8 shows this plasma chamber embodiment. A slotted electrostatic shield 31 exists outside the dielectric cylindrical sleeve to block electric field components on the rf applicator from while coupling magnetic field components on the rf applicator into the plasma-forming region. In this embodiment, a vacuum annulus 22 is formed between the dielectric cylindrical sleeve 19 and the cylindrical metal plug 21 and confines the plasma forming region 6 inside the vacuum annulus 22. Pre-processed gas flows into the vacuum annulus 22 where the hazardous waste reactants are dissociated by the inductively coupled plasma. The dissociated products exit to the recombination region 8 where they recombine to form recombination products and then exit through gas passage exits 24 on both end caps 23. In this embodiment, the radial distance between the interior of the dielectric cylindrical sleeve and the exterior of the cylindrical metal plug is set comparable to a total distance of the plasma depth and diffusion length for a time of transit through this plasma-forming region.

Alternatively, the radial distance between the interior of the dielectric cylindrical sleeve and the exterior of the cylindrical metal plug is set comparable to a distance of the plasma depth.

Figure 9:
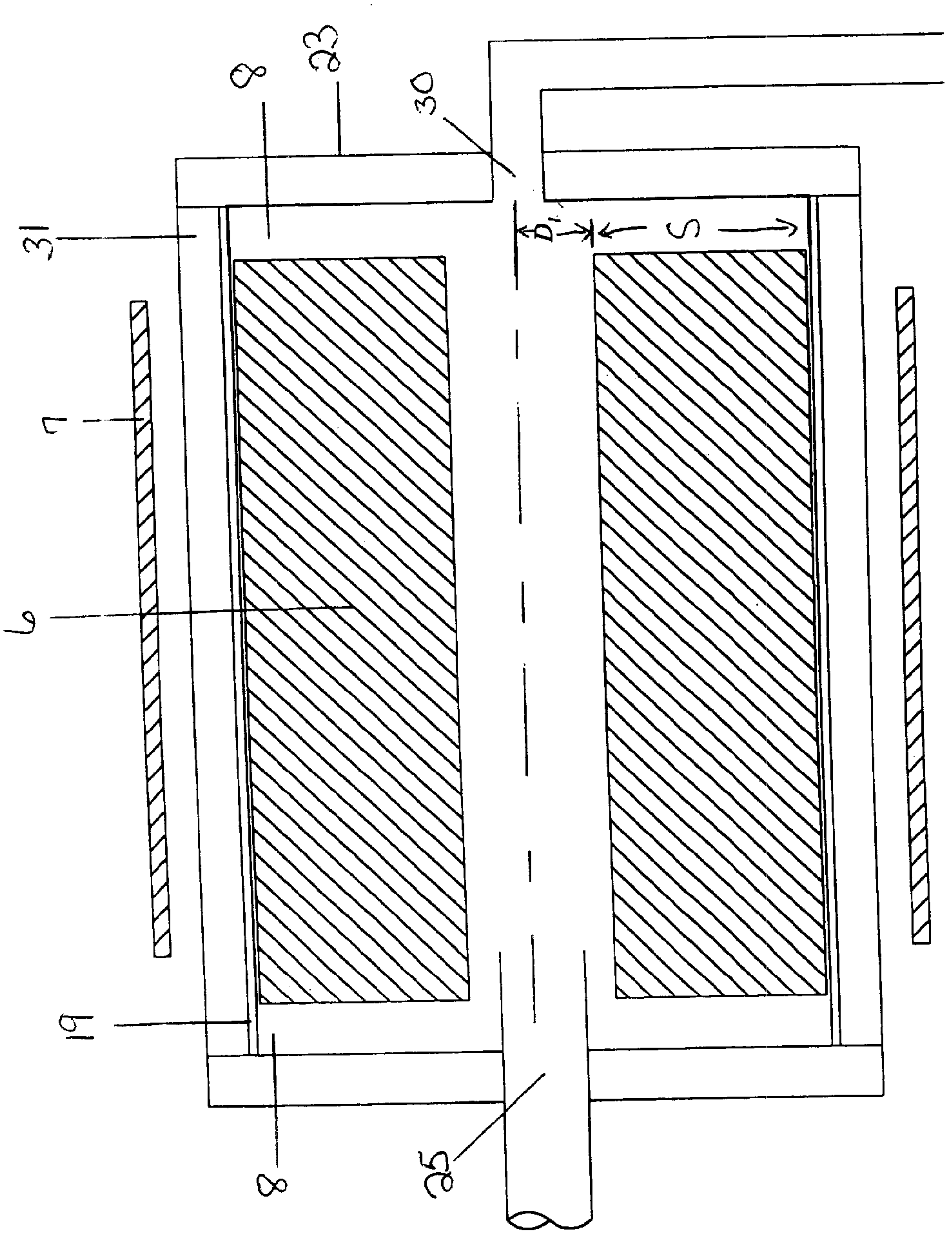
FIG. 9 is a schematic diagram of another embodiment of the present invention wherein the slotted electrostatic shield exists outside the dielectric sleeve and no cylindrical metal plug is utilized.

In yet another embodiment of the plasma chamber, the plasma chamber includes the dielectric cylindrical sleeve 19 disposed inside the slotted electrostatic shield 31 and end caps 23 on opposite ends of the dielectric cylindrical sleeve 19. FIG. 9 shows this plasma chamber embodiment. The end caps 23 are configured to provide a vacuum seal and provide a gas entrance 30 and a gas exit 25 from the plasma-forming region 6 contained inside the dielectric cylindrical sleeve 19. The dielectric cylindrical sleeve 19 provides a cylindrical space interior to the dielectric cylindrical sleeve. Pre-processed gas flows from one end of the dielectric cylindrical sleeve into the plasma-forming region 6 where the hazardous waste reactants are dissociated by the inductively coupled plasma. The dissociated products exit to the recombination region 8 where they recombine to form recombination products and then exit through at least one gas passage exit 25 on an opposite end of the dielectric cylindrical sleeve from the gas entrance 30. In this embodiment, an inside diameter of the dielectric cylindrical sleeve 19 is set comparable to twice a total distance of the plasma depth and the diffusion length for a time of transit through this plasm-forming region.

Alternatively, the inside diameter of the dielectric cylindrical sleeve 19 can be set comparable to twice the plasma depth.

The plasma furnace of the present invention is not restricted to a plasma furnace with a single plasma chamber. The plasma furnace as shown in FIGS. 10A–10D may contain a plurality of plasma chambers, such as for example plasma tubes 32, each plasma tube or dielectric cylindrical sleeve containing an inductively-coupled rf plasma. The individual plasma tubes 32 have inside diameters which are set comparable to twice a total distance of the plasma depth and the diffusion length for a time of transit through the plasma tube. Alternatively, the plasma tubes 32 may have inside diameters which are set comparable to twice a total distance of the plasma depth. The plasma tubes 32 will typically be made from quartz tube stock, but other materials such as glasses, engineered ceramics, mineral tubing, and any other such non-metallic tubing may be used. With diameters comparable to the plasma depth, the plasma uniformly engulfs each plasma tube such there exists no gas path by which nerve gas reactant can by-pass the plasma-forming region 6. The plurality of tubes permits the simultaneous processing of the same quantity of hazardous waste as could be processed in a large plasma chamber. The smaller diameter of the tubes relaxes engineering constraints on the plasma chamber allowing simple non-metallic tubes to be used as plasma chambers. The smaller diameter tubes increase the surface to volume ratio increasing the total heat dissipation available while reducing the total atmospheric force on each tube. For a given total heat load dissipated from the plasma furnace, using a plurality of smaller tubes reduces the maximum flux experienced by any singular tube. The plurality of tubes grouped inside a region of the plasma-forming magnetic field is driven by a rf applicator 7 about these tubes coupled to a resonating capacitor 25.

Figure 10A:
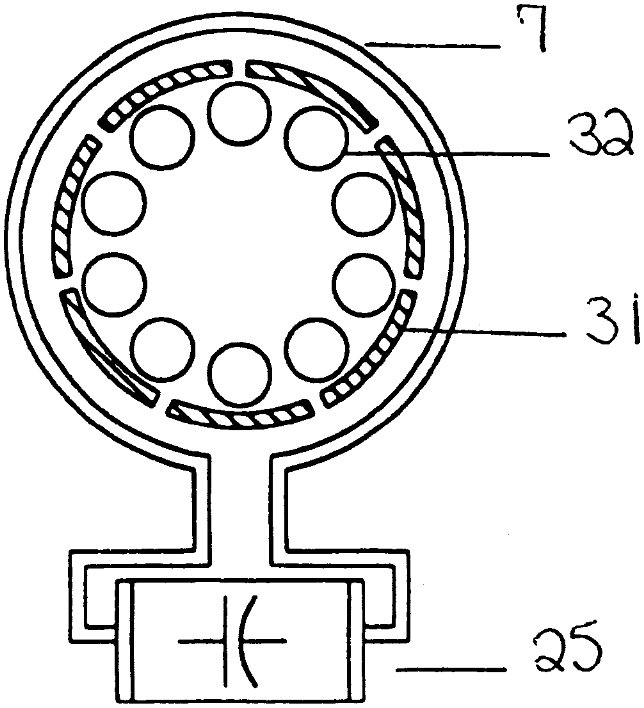
FIG. 10A is a schematic diagram showing a plasma furnace containing a plurality of individual plasma tubes arranged about an annulus inside a circular rf applicator.
Figure 10B:
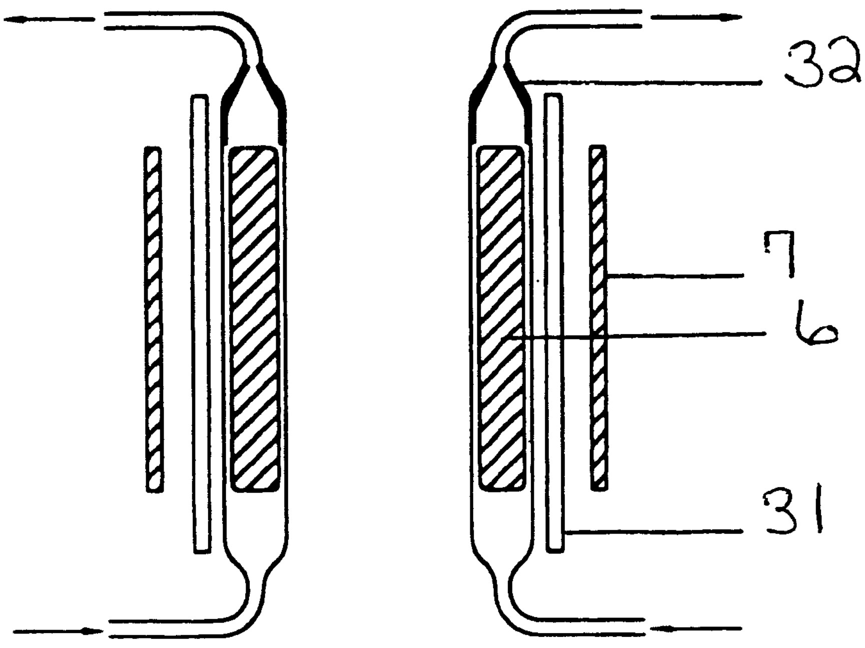
FIG. 10B is a schematic diagram showing a side view of the plurality of plasma tubes arranged about an annulus inside a circular rf applicator.
Figure 10C:
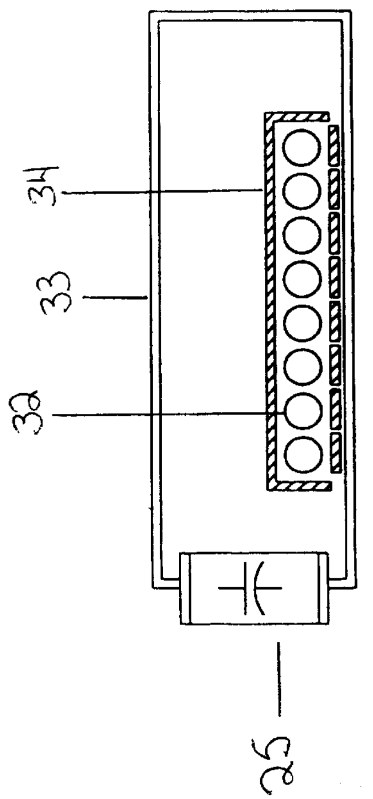
FIG. 10C is a schematic diagram showing a plasma furnace containing a plurality of individual plasma tubes arranged inside a rectangular rf applicator.
Figure 10D:
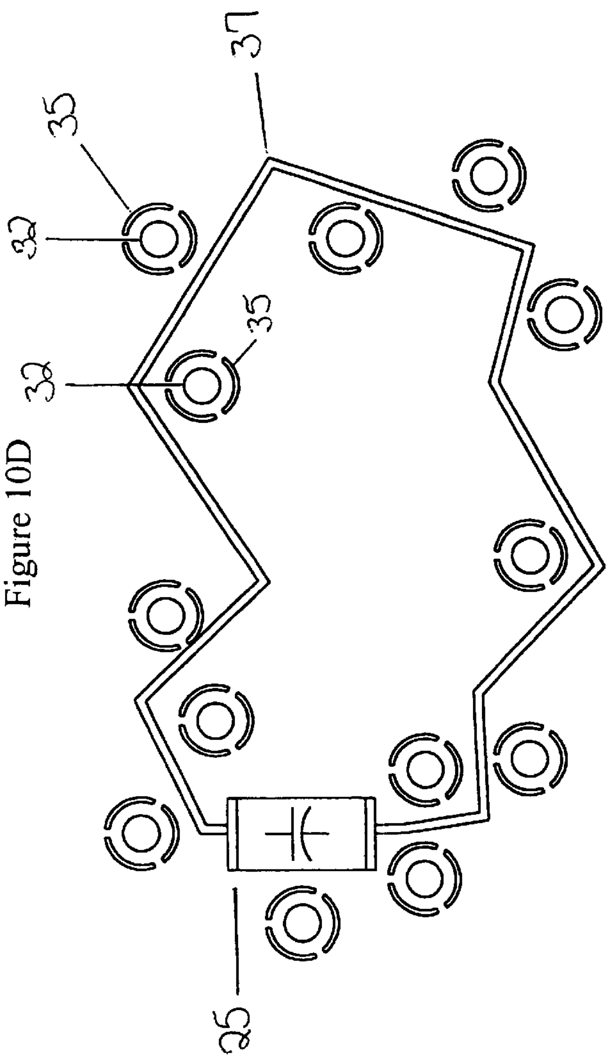
FIG. 10D is a schematic diagram showing a plasma furnace containing a plurality of plasma tubes arranged nearby the rf applicator.

The plurality of tubes can be grouped in annular fashion as shown in FIG. 10A. The grouping in FIG. 10A has one common electrostatic shield 31. Such an annular placement insures that the induced plasma currents do not screen the plasma-forming magnetic field from adjacent plasma tubes. FIG. 10B shows a side view of this particular arrangement further illustrating the perspective of the rf applicator width to the plasma tube height. The plurality of plasma tubes could, as shown in FIG. 10C, exist in a linear arrangement of plasma tubes. Each plasma tube is substantially the same as the plasma tube 32, with a rectangular rf applicator strap 33, a rectangular electrostatic shield 34, and a resonating capacitor 25. Other arrangements may be used such as the one shown in FIG. 10D wherein the plasma tubes are individually placed with individual electrostatic shields 35 in close proximity to a serpentine rf applicator 36 resonated by a capacitor 25. A particular hazardous waste disposal application might require a very large diameter rf applicator, approximating an rf transmission line in free space wherein a magnetic field on either side of the rf applicator would be equivalent. Plasma tubes could then be arranged in close proximity to the rf applicator and located on both sides of the rf applicator such as shown in FIG. 10D. One skilled in the art of rf engineering could readily derive other arrangements wherein the induced plasma currents in neighboring plasma tubes do not screen the plasma-forming magnetic field from adjacent plasma tubes.

In the plurality of plasma tubes, the inside diameter of the plasma tubes is set comparable to twice a total distance of the plasma depth and the diffusion length for a time of transit through the plasm-forming region. Alternatively, the plasma tubes 32 can have inside diameters which are set comparable to twice the plasma depth.

Referring back to FIG. 4, in a preferred embodiment, high frequency currents on the rf applicator 7 induce currents in the plasma which heat the plasma to extreme temperatures. Temperatures have been measured between 3100° C.–4200° C. The inductively coupled plasma in the plasma-forming region 6 disposes of hazardous waste reactants such as for example nerve gas agents by subjecting those agents to these extreme temperatures. At high temperatures, the molecular structure of nerve gas agents such as sarin $CH_3$—P(=O)(—F)(—OCH($CH_3$)$_2$) is dissociated, yielding simpler recombination products. Recombination products from the reactor may take the form of gaseous recombination products such as $H_2$, water vapor, CO and $CO_2$, or solid products such as phosphates $P_2O_5$, or liquid products such as condensed water vapor and HF which will have to be subsequently neutralized using standard acid-base neutralization reactions.

The extreme temperatures of the inductively coupled plasma cause the reaction rates for the molecular dissociation process to be extremely fast, as the reaction rate proceeds along an Arrhenius relationship given by equation (3).

$$\text{Reaction rate} = R_0 \times \exp\left(-E_a/kT\right), \tag{3}$$

where $R_0$ is the collision rate coefficient, $E_a$ is the activation energy, k is the Boltzmann constant, and T is temperature.

A fast reaction rate allows the dissociation of the nerve gas agents in a short duration which in turn means that the residence time in the reaction zone can be short and the velocity through the reaction zone can be high. Consequently, throughput of waste material can be made high.

The plasma furnace with the inductively coupled plasma is not agent specific. All complicated molecules upon exposure to the high temperature of the inductively coupled plasma dissociate into elemental components. Thus, the invention is not specific to a specific hazardous waste reactant chemistry. This non-specificity permits pre-processed gas contaminated with materials other than just nerve gas agents to be processed by the plasma furnace of the present invention without compromising the efficiency of the disposal process. This non-specificity also permits pre-processed gas from a variety of sources such as chemical and medical waste products to be processed by the plasma furnace of the present invention without compromising the efficiency of the disposal process.

The advantages of operating with high temperatures, short durations, and high throughput are nullified if a gas path exists for the incoming nerve gas agents to circumvent the inductively-coupled plasma. Cylindrical geometries are preferred in this invention. Inductively coupled plasmas naturally expand to occupy the largest available cross-sectional area but do not fill into sharp comers of chambers, as would be present in a rectangular cross-section plasma chamber such as taught by Robson et al.(U.S. Pat. No. 5,874,014). Additional expansion of the plasma into the area of a comer is offset by an increased electrical impedance, and thus the plasma does not fill the entire cross-sectional area of rectangular shaped chambers. Three candidate areas exist in rectangular-type chambers where nerve gas agents may bypass the inductively coupled plasma zone. These areas are the interior region where the applied magnetic fields from the rf applicator are screened by the exterior plasma currents (thus, plasma-forming region does not exist in the interior), the comer regions where the inductively coupled plasma does not fill, and slotted regions of the slotted metal bar array in which gas can by-pass the inductively coupled plasma by flowing through the open slots and around the plasma.

These areas provide leakage paths for the hazardous waste reactants to bypass the plasma-forming region. The presence of by-pass paths severely restricts the amount of reactant gas which can be processed without detection of hazardous waste reactants downstream from the plasma finance. Experiments at lower power levels in a simple cylindrical system without by-pass paths for gas circumvention of the plasma-forming region have shown that more than an order of magnitude improvement in conversion efficiency can be realized without a nerve gas agent stimulant being detected downstream from the plasma furnace by a quadrupole mass spectrometer.

COMPARATIVE EXAMPLE

To evaluate the effect of the gas by-pass paths on conversion efficiency and throughput, a rectangular cross-section plasma chamber was compared to a chamber of the present invention employing a simple cylindrical chamber such as shown in FIG. 9. Table 1 shows the comparison data.

In the comparative test, a simulant such as ethanol $C_2H_6O$ was used instead of an actual nerve gas agent such as sarin. $C_2H_6O$ is a reasonable non-toxic sarin simulant. Like sarin, ethanol exists as a liquid at room temperature; ethanol volatilizes at room temperature under sub-atmospheric pressure; ethanol has similar chemical bonds and bond strengths to sarin. It is well known in high temperature gas processing that large hydrocarbon-bearing molecules dissociate into smaller, simpler fragments at elevated temperatures. In the comparative test, the maximum flowrate is the flowrate at which $C_2H_6O$ becomes detectable in the exhaust gas stream when using a quadrupole mass spectrometer to detect its presence. The detection sensitivity of the quadrupole mass spectrometer used in this comparative test is about 1 ppm.

TABLE I

| chamber | Rectangular slotted metal chamber with open slots | Cylindrical quartz tube chamber inside slotted electrostatic shield |
|---|---|---|
| cross-sectional dimensions | 20 cm × 60 cm | 30 cm diameter |
| simulant | $C_2H_6O$ | $C_2H_6O$ |
| Pressure (Torr) | 2 | 0.28 |
| Power (kW) | 25 | 5 |
| power density (W/cm$^3$) | 0.9 | 0.2 |
| magnetic skin depth (cm) | 1.2 | 0.85 |
| plasma depth (cm) | ~2 | ~15 |
| maximum flowrate (sccm) | 775 | 2000 |
| efficiency (sccm/kW) | 35 | 400 |

It can be seen that the simple cylindrical configuration of the present invention has a conversion efficiency more than an order of magnitude higher than that of the rectangular-type chamber.

Figure 11A:
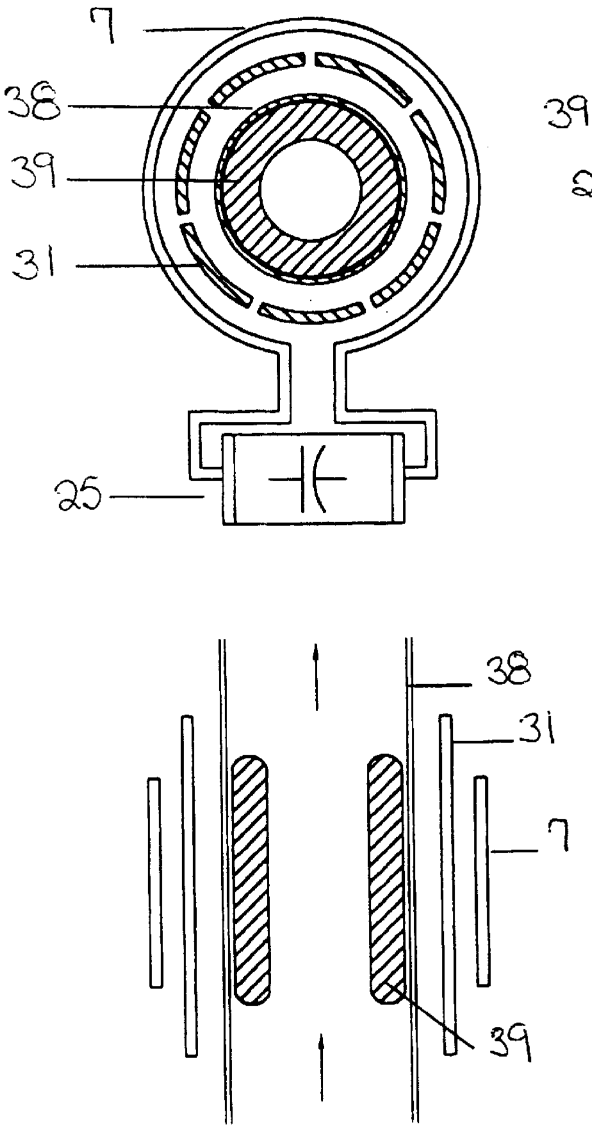
FIG. 11A is a schematic diagram showing an inductively-coupled plasma chamber arrangement.
Figure 11B:
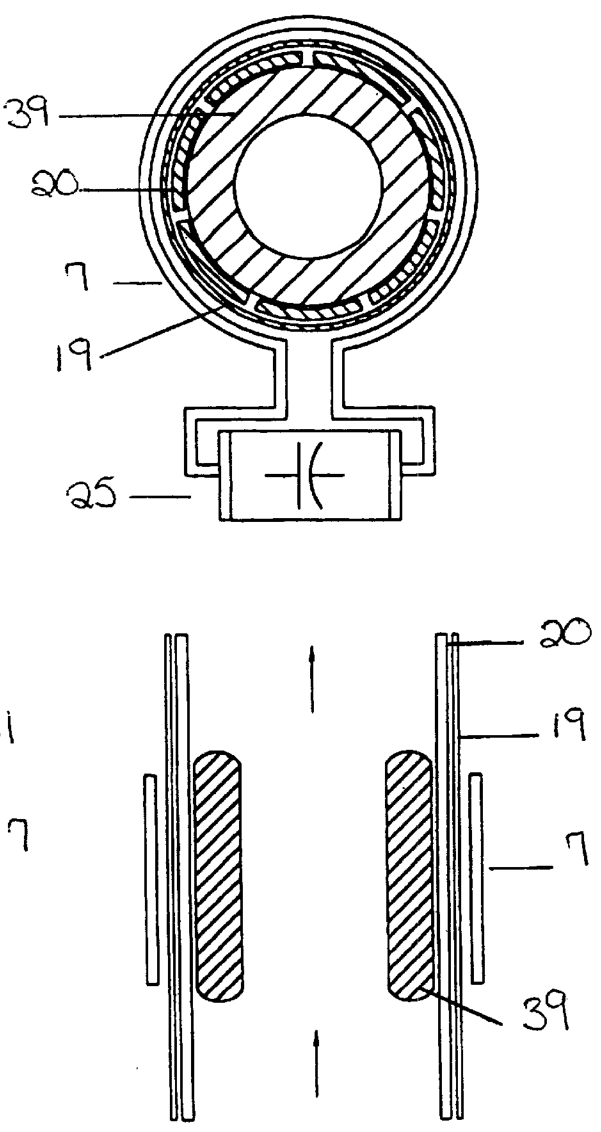
FIG. 11B is a schematic diagram showing a cylindrical slotted metal chamber inductively-coupled plasma chamber arrangement.

To better appreciate the nature of the problem and the teachings of this invention, consider hazardous waste reactants transported axially along a tube in two cylindrical inductively coupled plasma systems. FIG. 11A is a schematic diagram showing a top view of an inductively coupled plasma (ICP) with a rf applicator 7 surrounding a slotted electrostatic shield 31, surrounding a singular plasma tube 38 which contains a toroidal plasma 39. A capacitor 25 resonates the rf applicator 7 at the fundamental frequency. FIG. 11B shows a cylindrical slotted metal chamber ICP system with a rf applicator 7, surrounding a dielectric sleeve 19, surrounding a slotted metal bar array 20 which contains a toroidal plasma 39. A capacitor 25 resonates the rf applicator 7 at the fundamental frequency.

As shown in FIGS. 11A and 11B, the plasmas are toroidal with a hollow center. Magnetic field from the applicator is screened from the interior by exterior plasma currents existing within the magnetic skin depth. Furthermore, the plasma depth is not sufficient to allow energetic electrons created in the magnetic skin depth to penetrate to the toroidal center. Thus, the toroidal plasmas shown in FIGS. 11A and 11B do not occupy the entire cross-section of the plasma tube 38. In particular, the central region of the toroidal plasma provides a by-pass through which hazardous waste reactants can transit the plasma chamber without encountering the plasma-forming region 39. In addition, the open slots in the slotted metal bar array 20 of FIG. 11B provides another by-pass around the plasma-forming region 39.

Calculations have been made for the self diffusion of a gaseous species such as sarin entrained in a gas stream propagating axially along the plasma tube through the center of a 30 cm diameter tube encircled by a toroidal plasma such as the ones shown in FIGS. 11A and 11B. Calculations made for a pressure of 1 Torr and a throughput of 2 slm show that a sarin a molecule traveling 50 cm along the axis of the plasma tube will have a characteristic self-diffusion length of 1.93 cm, assuming the entire tube was at room temperature; and 3.77 cm, assuming the entire tube was at 7000° F. Thus, the gas does not diffuse far from its axial position even when the sarin molecule transits an extended length of 50 cm. Thus, sarin molecules which find themselves in a gas stream on axis near the top of a toroidal plasma will not in the short distance of a typical toroidal plasma, 5–10 cm, diffuse radially into the toroidal plasma. Rather, the gas stream will sweep sarin molecules through the center of the toroidal plasma unless the interior boundary of the toroidal plasma exists within a characteristic self diffusion length. At higher pressures, diffusion of sarin into the toroidal plasma will be even further limited. Thus, the central toroidal region represents an area where sarin molecules can by-pass the toroidal plasma.

Besides diffusion, turbulence could force sarin molecules in the pre-processed gas to be mixed into the toroidal plasma. For a large diameter tube (30.5 cm) necessary to create a large volume of plasma through which hazardous waste reactants can be simultaneously processed, calculations show that for typical pressures and flow rates of operation the flow is laminar in nature and not turbulent. In the literature, a Reynolds number characterizes whether or not a gas flow stream is turbulent or laminar. A Reynolds number $R_e$ of greater than 2200 is considered turbulent. A $R_e$ of less than 1200 is considered laminar. For flow in simple pipes, the Reynolds number for turbulent flow is achieved under the following condition shown in equation (4):

$$Q>196\times d \tag{4}$$

where Q is throughput in Torr-l/s and d is the pipe diameter in cm. For a 30.5 cm diameter tube, Q must be greater than 5,978 Torr-l/s or 471 sl/min to achieve turbulent flow. For typical processing flows of less than 2 sl/min, laminar conditions govern the gas flow streams and turbulent mixing is precluded. As can be seen from comparison of numbers, the process gas flow rates are ~2 orders of magnitude below turbulent flow conditions where mixing would occur.

The present invention overcomes these gas by-pass paths by design of a plasma-forming region wherein hazardous waste reactants must encounter the plasma-forming region on transit through the plasma chamber, thus dissociating the hazardous waste reactants.

Once dissociated in the inductively coupled plasma, the reaction of the dissociated products must be minimized to insure the simplest mixture of exiting effluent gasses. Otherwise, the dissociated products can react with themselves to produce a perplexity of species. Reduced pressure operation of the plasma furnace limits subsequent reactions of the dissociated species.

In gas-phase reaction chemistry, energy and momentum must be simultaneously conserved. For two-body collisions, this requirement precludes interaction of a species X with a species Y. One must have a third body involved in the collision process to form a reacted species such as XY. The probability of three-body collisions decreases as pressure falls below atmospheric conditions. At low pressures, such as 1 Torr, calculations show that the probability of three-body collisions is ~5 orders of magnitude lower than the probability of two-body collisions. Thus, gas phase recombination is severely restricted.

Furthermore at low pressure, diffusion of species in the gas phase becomes high. The diffusion coefficient given by the formula in equation (5) shows that the diffusion coefficient increases directly as pressure decreases.

$$D=(2.23\times10^{-20})V_a\times T/(P\times\delta_m^2) \quad (5)$$

where $V_a$ is the average molecular velocity, T is temperature in Kelvin, P is pressure in Torr, and $\delta_m$ is the molecular diameter in $cm^2$. As a result, species in the 3900° C. inductively coupled plasma diffuse to the walls of the plasma chamber and to the walls of the recombination region where they recombine. The recombination process gives up the heat of formation to the walls and produces simple chemical compounds such as $H_2$, $H_2O$, CO, $CO_2$, and $CH_4$. The recombined species are now less reactive. If the recombination occurs on the walls of the plasma chamber, the species will be emitted into the plasma-forming region and will once again be subject to dissociation. The emitted species do not regenerate hazardous waste reactants.

Reducing the pressure, as shown in the comparative example, provides the additional benefit that the plasma depth increases. The plasma occupies a larger volume of the plasma chamber, and the probability that a molecule can by-pass the plasma region decreases.

The reduced pressure operation of the plasma furnace of the present invention increases the conversion efficiency, serves to minimize subsequent gas-phase reactions, and eliminates transport of hot species from the plasma-forming region. As a result, the mixture of recombination products pumped from the plasma furnace to the capture facility is simplified.

Alternatively, the plasma furnace of the present invention can be used for gas phase processing other than hazardous waste disposal. The efficiency seen in processing hazardous waste reactants is expected to also be present in other gas phase processing. For example, powder production is a gas phase process wherein homogeneous nucleation in the gas phase produces small powders of ceramic or metallic particles. The reaction is driven by extreme temperatures which dissociate reactant molecules. The reactions take place at pressures which foster gas phase reactions leading to homogeneous nucleation of precipitates in the gas phase. Unlike, the hazardous waste application, these pressures will typically be greater than 10 Torr to promote gas phase nucleation and powder formation.

A variety of powders could be produced such as for example SiC, $Al_2O_3$, AlN, and BN powders. Even magnetic powders such as alloys of Fe, Ni, and Co, and other magnetic materials could be produced with the present invention.

For powder formation, the plasma furnace of the present invention would be operated at a process pressure sufficient to induce gas phase nucleation (i.e., above 20 Torr). Reactive gases containing the elemental components would be provided to the plasma-forming region. For SiC production, silane and methane could be used. For $Al_2O_3$ powder production, trimethyl aluminum and oxygen could be used. Concentrations of trimethyl aluminum and oxygen will have to metered such as avoid spontaneous combustion. For AlN production, trimethyl aluminum along with $N_2$ or $NH_3$ could be used. For magnetic powder production, carbonyls and hydrides of the elemental magnetic materials could be used.

Alternatively, induction plasmas have been used to produce fine SiC powder from Si powder injection into a carbon-containing plasma mixtures (Guo, Gitzhofer, and Boulos, Plasma Chemical Plasma Processes, vol 17, no. 2 (1997), pp. 219–249). Thus, elemental powder could be injected into the plasma furnace of the present invention and converted to an oxide, carbide, or nitride powder.

At these elevated pressures, the plasma depth will be on the order of 1 cm. At these pressures, the diffusion length will be on the order of less than 1 cm. Thus, the vacuum annulus 22 as shown in FIG. 4 or the dielectric cylindrical sleeve 19 as shown in FIG. 9 will need to be sized to ~1 cm to ensure complete activation of the reactive gases.

Similar to flat flame powder production (Skandan, Singhall, and Tompa, *Vacuum and Thin Film,* vol 2, no. 11 (November 1999), pp. 28–33), reactant species dissociated in the high temperature plasma-forming region of the present invention exit to the cooler recombination region wherein the dissociated species condense in the gas phase to form nuclei, grow in diameter due to pyrolysis of additional material onto these gas phase nuclei, and then subsequently quench, limiting the particle growth size.

By adjusting the quench zone with pressure and flow rate the particle size distribution can be controlled. One advantage of a narrow quench zone is that the resulting particle distribution is also narrow.

III. The rf Power Supply

Traditional arrangements employed in delivery of rf power to induction coupled loads usually employ an extensive multiplicity of circuits to generate, transport, match, and couple rf power to a specific load that is being driven. A typical arrangement begins with a rf generator, which may be a simple oscillator, or may be a combination oscillator-amplifier. This apparatus converts energy from a commercial electrical supply to rf energy, then normally outputs this converted energy at a fixed or narrow range of impedance. The generator is then connected by means of a transmission line of fixed impedance to a matching network, a configuration of tuned circuitry that converts the rf energy to the desired impedance level demanded by the induction coupled load. The matching network is in turn connected by means of a short section of transmission line of usually unknown impedance to an antenna for broadcast of rf power. When either the generator or the load, or both have on-linear characteristics, the circuitry employed will display a number of resonant oscillations at various frequencies that may or may not cause practical difficulties in power delivery or circuit reliability.

The traditional arrangement just described has many desirable attributes including the ability to readily measure the delivered power, readily re-adjust coupling parameters, filtering and use of modular assemblies, and the like. But as the power level is raised, these advantages begin to be overcome by the destructive effects of spurious resonances that can be ignored at low powers. These traditional arrangements have been used successfully for many years to couple and deliver large powers from linear sources to linear loads at fixed impedances. When the load is non-linear and the power is high, difficulties will arise in proportion to power level.

To better appreciate the rf power oscillator of the present invention, several behaviors of practical circuits used for rf power generation and transmission must be understood. First, vacuum tubes do not output a sinusoidal wave of energy at the fundamental frequency. Rather, the vacuum tube is switched on and then off at appropriate times in a rf cycle at a switching frequency corresponding to a fundamental frequency of oscillation. A tube when switched on conducts electrons from a cathode to an anode inside the vacuum tube. This switching is synchronized to electrical oscillations taking place within an antenna resonant circuit or tank circuit in such a manner as to allow addition of switched DC energy to be output to the antenna resonant circuit and thence to the induction coupled load. The synchronized switching of the vacuum tube is accompanied by very non-linear, high time-rate-of-change currents that contain components of energy at all frequencies. The tube is turned on when instantaneous voltages on a grid of one vacuum tube reach a critical turn-on value. The tube conducts current until the instantaneous voltages falls below the critical turn on value. The voltage rise and fall is determined in part by the rf voltage capacitively coupled to the grid from the vacuum tube anode which is connected to the resonant tank circuit of the oscillator.

Tube switching at the fundamental frequency excites spurious resonances that are all coupled to the vacuum tube. Whether or not such resonances are in a position to cause feedback and change the switching frequency of the tube will determine whether the tube drives on these alternative frequencies. The output energy developed within any narrow band of frequencies is related to the proximity this band has to the fundamental frequency or one of its harmonic frequencies. Any band which is not too far removed in frequency from the operating frequency has finite and considerable energy available within the band. An oscillator will always prefer to operate at a frequency that supplies the greatest amount of feedback, and this frequency is often higher than the fundamental frequency. Undesired circuits typically have no designed load so that the amplitude of undesirable oscillations increases until voltage and current ratings on components in the undesired circuit are exceeded, destroying circuit components. With no load, even relatively small amounts of energy at non-fundamental frequencies compared to the energy at the fundamental frequency can produce extreme conditions of voltage and current which if coupled back to the grid of the vacuum tube can turn on the vacuum tube at frequencies other than the fundamental frequency. This phenomenon is the reason that undesired oscillations so heavily influence otherwise stable circuits.

Thus, while many standard power supplies are available to power plasma sources, the demands of the plasma furnace of the present invention places new constraints on power and reliability of the rf power source. One fundamental constraint which must be addressed is consistent delivery of high-power rf energy to the plasma-forming region. Every additional kilowatt of rf power input to the plasma-forming region enables the plasma furnace to process hazardous waste reactants faster. Thus, high rf power levels are preferred. Due to the toxicity of the nerve gas agent, interruptions in rf power to the plasma waste furnace cause interruptions in the dissociation of the hazardous waste reactants. Furthermore, the containment chamber does not provide a monotonic gas supply to the plasma furnace. The chemical constituency of effluent from the containment chamber varies from storage container to storage container and varies for each container as different contents in the disposal containers volatilize at different times in the temperature ramp to 1000° F. The inductively coupled plasma in the plasma furnace represents a dynamic load to the rf power supply.

A partial solution to the dynamic characteristics of the plasma in the plasma furnace is to provide a high frequency oscillator which couples directly to a tank circuit surrounding a plasma load. U.S. Pat. No. 5,874,014 to Robson et al. shows coupling of such a high frequency oscillator to a tank circuit surrounding a slotted metal chamber containing an inductively-coupled plasma. Unfortunately, reliability problems exist in this solution when power levels exceed the 15–25 kW power levels taught by Robson et al.

Figure 12:
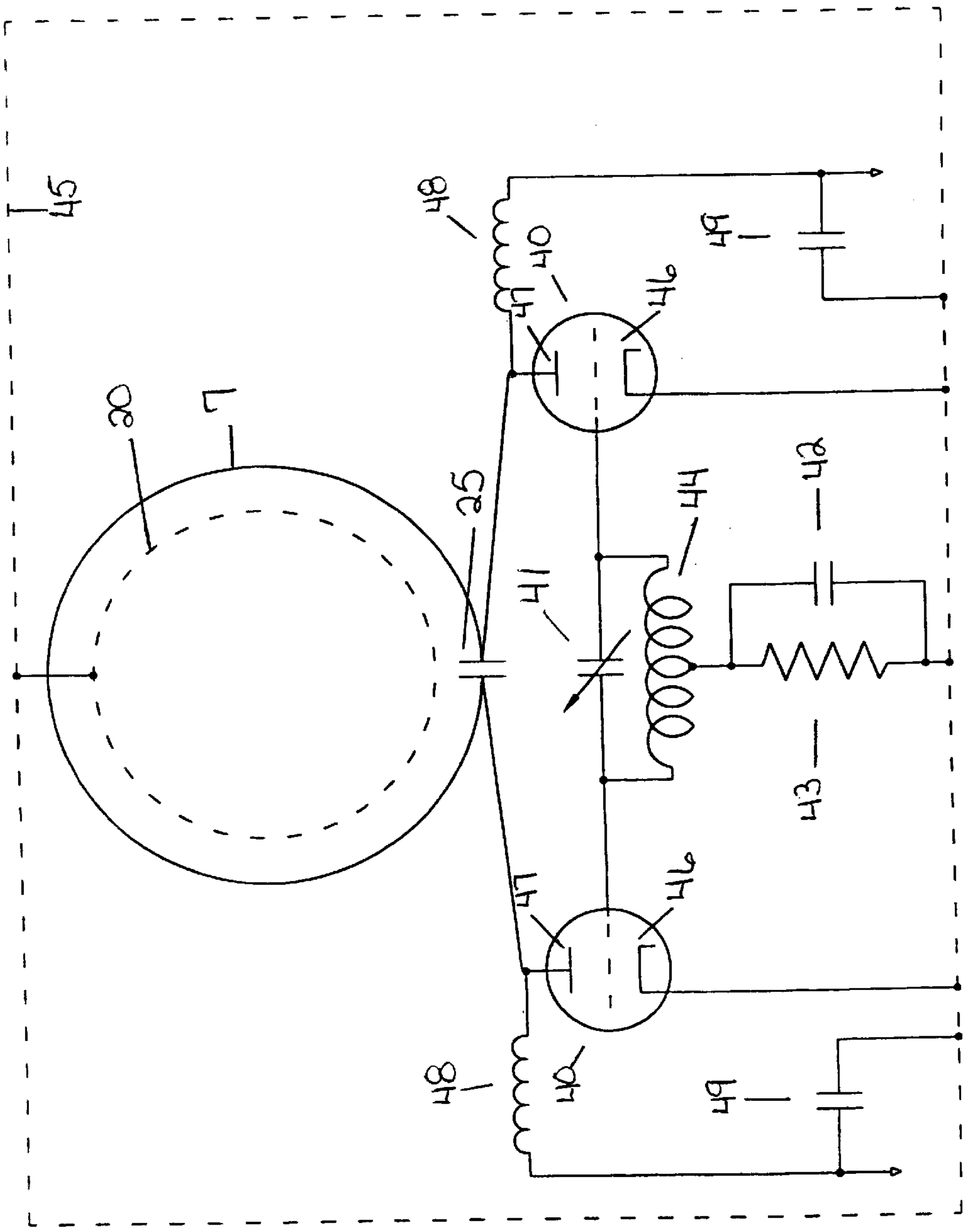
FIG. 12 is an electrical schematic of an power supply intended for waste stream disposal at a power level of 1,500 kW.

Consider in FIG. 12 a representative electrical schematic of a power supply intended for plasma waste disposal on the plasma furnace of the present invention. Component parts of this oscillator/antenna arrangement are the rf applicator 7, resonating tank capacitor 25, vacuum tubes 40, a variable capacitor feedback level adjustment 41, a grid bias shunt capacitor 42, a grid bias resistor 43, rf inductor 44, shield enclosure 45, and slotted metal bar array 20. The variable capacitor feedback level adjustment 41, the grid bias shunt capacitor 42, the grid bias resistor 43, and the rf inductor 44 form a reactive control network to control current conduction between current conduction terminals of the vacuum tubes (i.e. a cathode 46 and anode 47 of each vacuum tube). Positive, dc high voltage is supplied to the anode of each tube through rf chokes 48. A filter capacitor 49 is used to short rf noise to ground before it enters the dc supply. A shield enclosure 45 surrounds the rf power supply to prevent broadcast of rf power into the environment about the plasma furnace.

This circuit arrangement is a standard class C push-pull oscillator, with its tank inductor (i.e., the rf applicator 7) encircling the slotted metal bar array 20. Large rf currents are caused to flow in the rf applicator 7 by means of high rf voltages developed across the tank capacitor 25. This circuit is simple, reliable, and easy to execute at power levels of 1000 W, but as power increases, instabilities occur. These instabilities arise due to harmonic energy content at non-fundamental frequencies. This energy content couples itself into various circuit components, many of which can not tolerate this energy level.

These problems are compounded by the unique problem of coupling rf power through the slotted metal bar array and slotted electrostatic shields of the present invention. These problems must be satisfactorily addressed if stable high power rf energy is to be supplied to the plasma-forming region.

Figure 13:
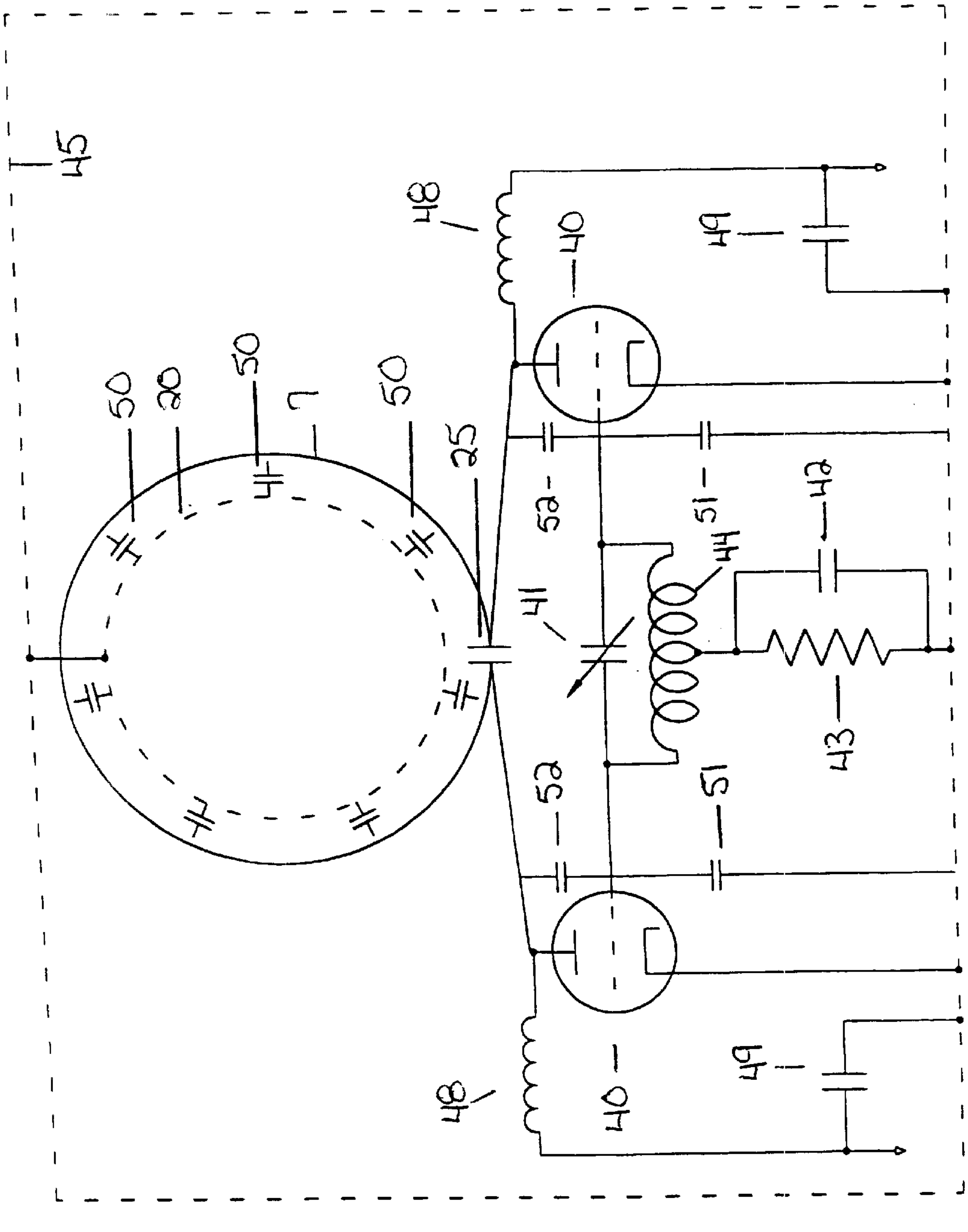
FIG. 13 is another electrical schematic of the realized oscillator/antenna with stray capacitances specifically noted.

FIG. 13 illustrates how stray capacitances can take on unusual significance.

First, the magnitude of the stray capacitance to ground is increased in the present invention by the presence of the slotted electrostatic shield or the slotted metal bar array connected to ground in close proximity to the rf applicator. FIG. 13 depicts the stray capacitance from the rf applicator to the slotted metal bar array as element 50. This capacitance (C) while shown distributed can be thought of a discrete component whose reactance ($i/\omega C$) decreases as the frequency $\omega$ increases. The problem can not be simply corrected by moving the applicator away from the slotted metal chamber, as moving the applicator away decouples the rf applicator from the inductively coupled plasma. Ground loop paths through the slotted electrostatic shield provide feedback to the vacuum tubes, especially at parasitic frequencies higher than the fundamental frequency.

Second, the slotted electrostatic shield blocks high frequency voltages from the plasma. Consequently, rf voltages at the parasitic frequencies are not coupled into the plasma load, and thus the parasitic frequencies have no means by which to dissipate power into the plasma. Thus, with no load, the amplitude of these parasitic frequency oscillations on the rf applicator can begin to capacitively couple back through the vacuum tube anode to the grid and provide feedback to the vacuum tube.

And third, the high tank capacitance, necessary to resonate the rf applicator inductance at the fundamental frequency, is a capacitive shunt at parasitic frequencies. Consequently, resonant circuits can exist between the vacuum tube connecting leads which can provide positive feedback to the vacuum tube for switching at parasitic frequencies.

Thus, a multiplicity of circuit paths exist for providing unintended feedback to the oscillator. If voltages at these parasitic frequencies become greater that the critical turn-on value, the vacuum tube switches on in synchronization with the parasitic frequency, producing instabilities in power delivery.

Traditional approaches would attempt to eliminate these feedback circuit paths by appropriate selection of component capacitive or reactive values, wherein in an attempt is made to have no unintentional resonant circuits, other than the fundamental tank circuit of the oscillator. However, work by the present inventors has shown that resonances in the structure and circuits of the rf power oscillator, the plasma chamber of the present invention, and the enclosures always exist. As power levels are elevated, stray power is coupled into these circuits providing feedback to the high frequency power oscillator. At still higher power levels, feedback becomes sufficient to turn-on the vacuum tube at parasitic frequencies, resulting in unstable power operation.

In addition, undesired oscillations in the power oscillator are amplified by non-linear load characteristics. Even when energy supplied to the plasma load is spectrally fairly pure, the plasma load will generate mixing and spurious frequencies due to non-linearities in the plasma load.

Figure 14:
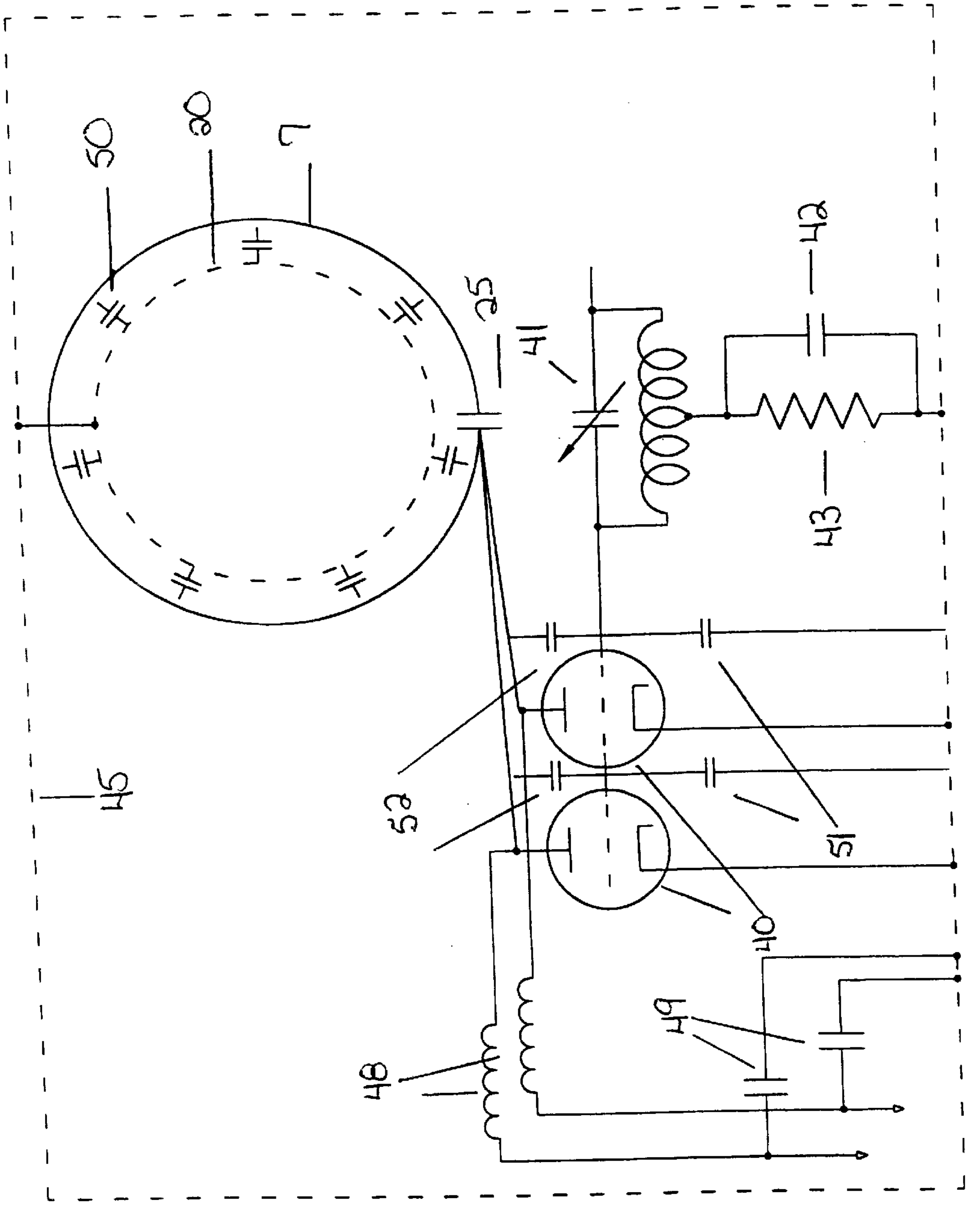
FIG. 14 is an electrical schematic of an oscillator configuration functionally equivalent to the circuit in FIG. 9 when stray capacitances dominate feedback.

As an exemplary teaching, FIG. 13 shows stray capacitances which exist on the wire leads from the vacuum tubes 40. These stray capacitances are depicted as discrete components 51 and 52 for purposes of discussing their effect on the oscillator circuit. At higher than intended frequencies 1.5×f to 10×f, where f denotes the fundamental frequency, the circuit reactances (as $i\omega L$ and $i/\omega C$, where ω os 2πf and L and C are the inductance and capacitance, respectively) change to values wherein the same physical arrangement of tubes and wires can produce different electrical operation. More specifically, at higher than operating frequencies, the stray capacitances 51 and 52 from wire leads present significant reactances while the normal tuned grid circuit components 41 and 44 become capacitive shunts. In effect, the circuit of FIG. 13 "acts" like the circuit depicted in FIG. 14 wherein a capacitive bridge is formed by the capacitive reactances of capacitors 51 and 52. Voltages dividing on this bridge provide feedback control to the grid. Both power oscillator tubes can switch power simultaneously at some undesired frequency dictated by this circuit in close proximity to the grid, and the circuit no longer functions as a push-pull circuit.

The high frequency power oscillator of the present invention is realized by first minimizing the number of component parts and thereby eliminating many incidental circuit paths. The remaining parts are variously proportioned or located to reduce ringing voltage amplitudes and are designed in tolerance for current, voltage, or heat stress. Even the most minimal circuit will have a multiplicity of resonant modes.

The circuit, having been minimized, is then characterized for its responses at different frequencies by introducing energy from a test oscillator that is coupled to the various electromagnetic structures within the circuit and the shield. Each response identified is catalogued, and the supporting electromagnetic structure is defined. This process is carried out over a range of frequencies from about one tenth to about ten times the operating frequency. Circuit and component difficulties between f and 10×f cause almost all of the practical instability and failure problems associated with execution of the oscillator design at power.

Figure 15:
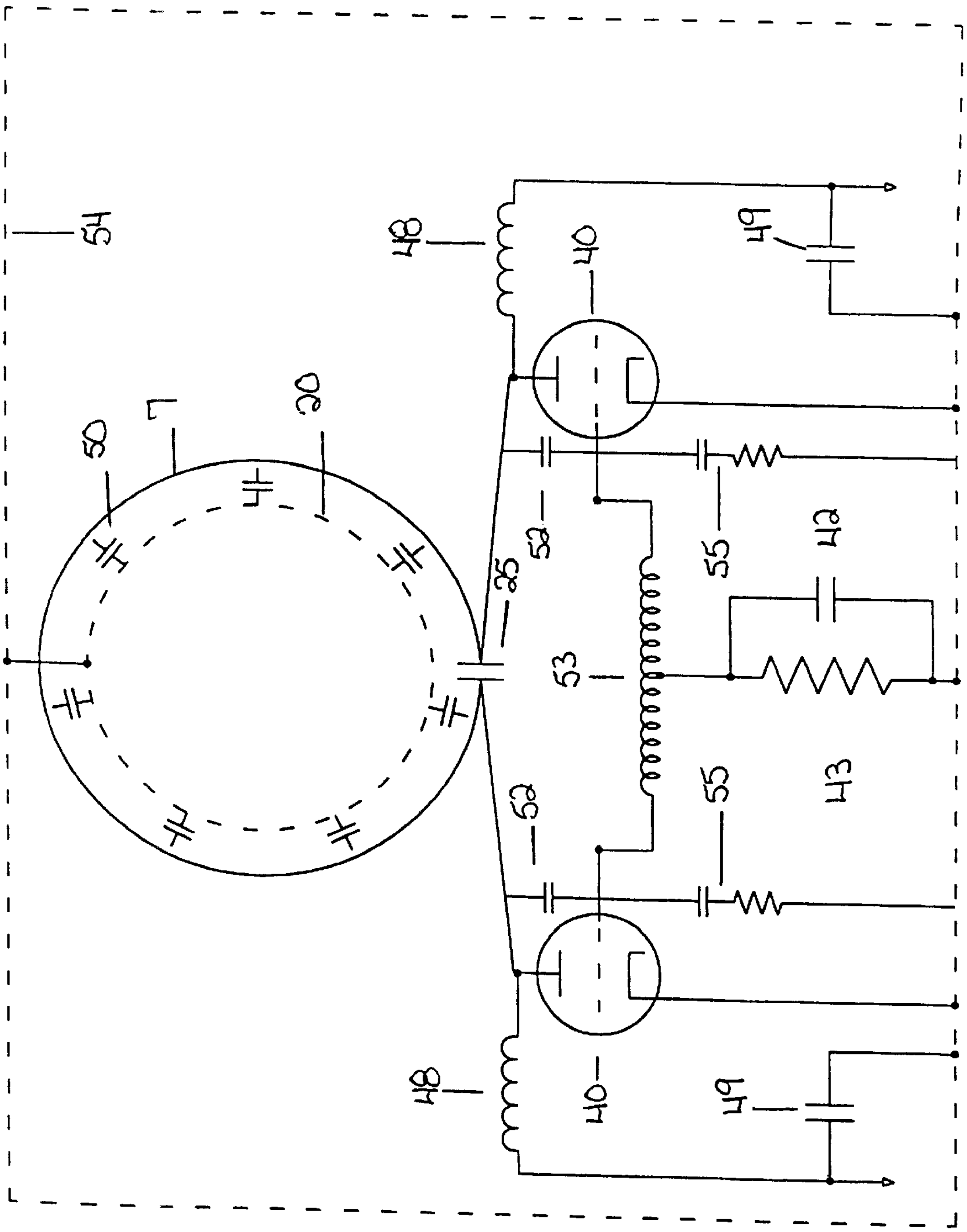
FIG. 15 is a detailed electronic schematic of the power supply designed for waste stream disposal at a power level of 1,500 kW where engineered power loss components are detailed.

FIG. 15 is an electrical schematic of a power supply for a plasma waste disposal furnace with circuit modifications explicitly shown to overcome many of the parasitic oscillation problems. The power supply design shown in FIG. 15 overcomes these problems by adding novel parasitic power dissipation mechanisms to achieve stable operation. Stable operation at high power is achieved by careful design of the oscillator circuit so as to prevent unwanted resonances from developing destructive voltages and currents when excited by the broadband energy available from the oscillator.

Due to the high capacitance of the tanks capacitors 25, a circuit as shown in FIG. 12 comprising a loop from one vacuum tube through capacitor 25 to the other vacuum tube and returning through capacitor 41 represents a circuit whose feedback to the grid can create undesirable parasitic oscillations. As shown in FIG. 15, the capacitive component 41 is removed from the circuit. Unfortunately, resonances in this circuit can still drive feedback to the grid leads on the tube. To overcome this problem, a standard coil, typically wound with Cu tubing 3.2 mm in diameter and wound with the necessary number of turns to establish the proper rf bias on the grid is replaced with a compacted coil 53 wherein the compacted coil structure is wound from smaller Cu tubing or wire stock into a more compact size with nearly the same inductive reactance but twice the resistance and twice the dissipative power at the fundamental and parasitic frequencies.

Table 2 shows relative data for the standard and compacted coil One can see that the two coils have nearly the same inductive reactance. Yet the smaller wire size and increased turns produce a coil whose power loss is nearly twice that of the original coil. Thus, the relatively small amount of power coupled into this circuit at parasitic frequencies by the tube switching at its fundamental frequency will be dampened by the higher power loss of the resistive coil. In this example, the power loss in the coil needs only to be sufficient to prevent the oscillations at 35 MHz from turning on the vacuum tube to electron conduction. Oscillations of the grid at 35 MHz which do not turn on the vacuum tube to electron conduction do not create instabilities in the high frequency power oscillator. Suppose for example, that a specific vacuum tube turns on (i.e. conducts electrons to the anode) at an instantaneous voltage of −200 V. A dc bias of −1000 V exists on the grid from the grid bias resistor 43. The 35 MHz parasitic oscillation must have a peak value of 800 V to enable electron conduction across the tube. The increased resistance of the resistive coil retards peak values in voltage for the parasitic 35 MHz frequency to below 800 V peak, while allowing higher output power at the fundamental frequency to be delivered.

TABLE 2

| | standard coil | compacted coil |
|---|---|---|
| coil diameter, in | 7.6 | 3.8 |
| coil radius, cm | 3.8 | 1.9 |
| coil length, cm | 12.7 | 12.7 |
| number of turns | 7 | 13.25 |
| wire diameter, mm | 3.2 | 1.6 |
| reactance at 5 MHz, Ω | 54.5 | 54.6 |
| power loss at 5 MHz, W | 132 | 250 |
| power loss at 35 MHz, W | 0.28 | 0.54 |

Another parasitic power dissipation mechanism which has been developed for the rf power supply of the present plasma waste disposal furnace is a perforated stainless steel shield 54. The shields 45 shown in FIGS. 12 and 13 which were fabricated from Al and Cu screen have been replaced in FIG. 15 with the perforated stainless steel shield 54 having an estimated 50-fold increase in sheet resistance. The perforated stainless shield provides a distributed loss component for currents circulating in the stainless steel shield. The perforated stainless steel shields become more critical as the dimensions of the shield enclosure approach a wavelength of a parasitic oscillation such as, for example, 50 MHz, where the quarter wavelength is ~1.5 m. Here, cavity-type resonances formed by the enclosure can start to develop standing waves which can couple voltages back the grid circuit.

Besides these parasitic power loss mechanisms, frequency selective loss devices have been implemented. FIG. 15 shows a frequency selective loss device connecting each vacuum tube grid lead to the grounded anode connection of each respective vacuum tube. Here, a series capacitor-resistor device 55 provides a frequency selective loss device to dissipate high frequency parasitic voltages from the grid leads. The device is frequency selective because the capacitor in series with the resistor provides a changing impedance which decreases at higher frequencies. Thus, voltages developing on the grid at frequencies, for example at 10×f, see an impedance 10× lower due to the reduced capacitive reactance. Voltages are dissipated by current flow across the capacitor through the resistor to ground. The presence of the resistor prevents this frequency selective power loss mechanism from itself forming a low loss resonant circuit.

A power supply utilizing the aforementioned power loss mechanisms has successfully inductively coupled at 5 MHz, 100–200 kW of delivered power into a hydrogen-based plasma for sustained periods of time (1–3 days) without power interruption.

Besides practice of the rf power supply with a vacuum tube push-pull oscillator, other high frequency oscillators such as solid state power supplies could be used provided that the parasitic power dissipation mechanisms are used to suppress feedback of parasitic energy onto the reactive control network of the solid state supply. In this case, solid state switching devices such as bipolar transistors having a control terminal base and current controlling terminals (i.e. a collector and an emitter) may be employed.

IV. The Capture Facility

The capture facility utilizes standard practices for the capture and containment of gasses and condensates. These facilities as shown in FIG. 2 may include for example a system as simple as a series of pumping stages 56 to compress the recombination products into a storage bottle 57. Or, the capture facility may employ a variety of techniques known in the art of gas capture such as solidification (i.e., cryo-pumping), condensation, and entrapment (i.e., sorption pumping).

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patents of the Unites States is:

1. An apparatus for plasma disposal of hazardous waste, comprising:

a containment chamber configured to volatilize hazardous waste material at sub-atmospheric pressure and to provide at a containment chamber outlet a pre-processed gas including hazardous waste reactants; and a plasma furnace comprising, an inlet coupled to the containment chamber outlet and configured to introduce at sub-atmospheric pressure the pre-processed gas into the plasma furnace, a plasma chamber including a plasma-forming region coupled to the inlet and in which a plasma-forming magnetic field is produced, said pre-processed gas passing without circumvention through the plasma-forming region, an rf power supply including an rf applicator configured to produce a plasma-forming magnetic field of sufficient inductive energy into said plasma-forming region such that said hazardous waste reactants during transit through the plasma-forming region are inductively coupled into a plasma having a plasma depth and are completely dissociated, a recombination region coupled to said plasma forming region in which the dissociated reactants recombine into recombination products upon exiting the plasma-forming region, and an outlet coupled to the recombination region and configured to remove the recombination products from the plasma furnace.

2. The apparatus of claim 1, comprising:

a vacuum pump coupled to the plasma furnace outlet and configured to maintain a sub-atmospheric pressure in the plasma furnace.

3. The apparatus of claim 2, wherein said vacuum pump is configured to maintain a sufficiently low pressure in the recombination region such that dissociated hazardous waste reactants exiting the plasma-forming region diffuse to and quench on walls defining the recombination region without reforming hazardous waste reactants.

4. The apparatus of claim 3, wherein said vacuum pump is configured to maintain a pressure below 20 Torr in said recombination region.

5. The apparatus of claim 3, wherein the plasma chamber comprises:

a slotted electrostatic shield disposed between the rf applicator and the plasma forming region and configured to block electric field components and couple magnetic field components on the rf applicator into the plasma-forming region; and a dielectric cylindrical sleeve coaxially disposed in relation to the slotted electrostatic shield and configured to form a vacuum boundary for the plasma chamber.

6. The apparatus of claim 5, wherein the slotted electrostatic shield comprises:

a slotted metal bar array coaxially disposed inside the dielectric cylindrical sleeve and configured to support a vacuum force on the dielectric cylindrical sleeve, said slotted metal bar array having slots filled with a dielectric material.

7. The apparatus of claim 6, wherein said plasma-forming region exists as a cylindrical space confined by an interior of the slotted metal bar array, further comprising:

end caps sealing the cylindrical space between said slotted metal bar array and said end caps; and said inlet and said outlet of the plasma furnace communicating with said interior of the slotted metal bar array through at least one opening in each end cap.

8. The apparatus of claim 7, wherein an inside diameter of the slotted metal bar array is less than or equal to twice a total distance of the plasma depth and a diffusion length of said pre-processed gas during the transit through the plasma forming region.

9. The apparatus of claim 7, wherein an inside diameter of the slotted metal bar array is comparable to twice the plasma depth.

10. The apparatus of claim 7, wherein the plasma chamber comprises:

a cooling fluid supply within the slotted metal bar array.

11. The apparatus of claim 6, wherein the plasma chamber comprises:

a cylindrical metal plug concentric to the dielectric cylindrical sleeve and the slotted metal bar array and defining between said cylindrical metal plug and said metal bar array a vacuum annulus including said plasma forming region;

end caps sealing the vacuum annulus between said cylindrical metal plug, said slotted metal bar array, and said end caps; and said inlet and said outlet of the plasma furnace communicating with said vacuum annulus.

12. The apparatus according to claim 11, wherein said cylindrical metal plug comprises an injector mechanism configured to inject said pre-processed gas into an axially central portion of said vacuum annulus and said end caps each include at least one said outlet coupled to said recombination region.

13. The apparatus of claim 11, wherein a radial distance between the slotted metal bar array and the cylindrical metal plug is less than or equal to a total distance of the plasma depth and a diffusion length of said pre-processed gas during transit through the plasma-forming region.

14. The apparatus of claim 11, wherein a radial distance between the slotted metal bar array and cylindrical metal plug is comparable to the plasma depth.

15. The apparatus of claim 11, wherein the plasma chamber comprises:

a cooling fluid supply within the slotted metal bar array and the cylindrical metal plug.

16. The apparatus of claim 5, wherein said dielectric cylindrical sleeve is disposed within said slotted electrostatic shield and the plasma chamber comprises:

a cylindrical metal plug concentric to the dielectric cylindrical sleeve and the slotted electrostatic shield and defining between said cylindrical metal plug and said dielectric cylindrical sleeve a vacuum annulus including said plasma forming region;

end caps sealing the vacuum annulus between said cylindrical metal plug, said dielectric cylindrical sleeve, and said end caps; and said inlet and said outlet of the plasma furnace communicating with said vacuum annulus.

17. The apparatus according to claim 16, wherein said cylindrical metal plug comprises an injector mechanism configured to inject said pre-processed gas into an axially central portion of said vacuum annulus and said end caps each include at least one said outlet coupled to said recombination region.

18. The apparatus of claim 16, wherein a radial distance between the dielectric cylindrical sleeve and the cylindrical metal plug is less than or equal to a total distance of the plasma depth and a diffusion length of said pre-processed gas during the transit through the plasma forming region.

19. The apparatus of claim 16, wherein a radial distance between the dielectric cylindrical sleeve and the cylindrical metal plug is comparable to the plasma depth.

20. The apparatus of claim 16, wherein the plasma chamber comprises:

a cooling fluid supply outside the dielectric cylindrical sleeve and within the cylindrical metal plug.

21. The apparatus of claim 5, wherein said dielectric cylindrical sleeve is disposed within said slotted electrostatic shield and the plasma chamber comprises:

end caps sealing a cylindrical space interior to said dielectric cylindrical sleeve; and said inlet and said outlet of the plasma furnace communicating with an interior of said cylindrical space.

22. The apparatus of claim 21, wherein an inside diameter of the dielectric cylindrical sleeve is less than or equal to twice a total distance of the plasma depth and a diffusion length of said pre-processed gas during the transit through the plasma forming region.

23. The apparatus of claim 21, wherein an inside diameter of the dielectric cylindrical is comparable to twice the plasma depth.

24. The apparatus of claim 21, wherein the plasma chamber comprises:

a cooling fluid supply outside the dielectric cylindrical.

25. The apparatus according to claim 5, wherein a plurality of said dielectric cylindrical sleeves is disposed within said rf applicator and said plasma-forming region comprises a plurality of cylindrical spaces confined by an interior of each dielectric cylindrical sleeve, further comprising:

a plurality of end caps sealing the interior between said each dielectric cylindrical sleeve and each end cap; and said inlet and said outlet of the plasma furnace communicating with the interior of each dielectric cylindrical sleeve through at least one opening in each end cap.

26. The apparatus of claim 25, wherein an inside diameter of each dielectric cylindrical sleeve is less than or equal to twice a total distance of the plasma depth and a diffusion length of said pre-processed gas during the transit through the plasma forming region.

27. The apparatus of claim 25, wherein an inside diameter of each dielectric cylindrical sleeve is comparable to twice the plasma depth.

28. The apparatus of claim 25, wherein the plasma chamber comprises:

a cooling fluid supply outside each dielectric cylindrical sleeve.

29. The apparatus according to one of claims 25–28, wherein said plurality of said dielectric cylindrical sleeves are arranged in a circle with one electrostatic shield disposed around the circle of dielectric cylindrical sleeves.

30. The apparatus according to one of claims 25–28, wherein said plurality of said dielectric cylindrical sleeves are arranged in a line with one electrostatic shield disposed about the linear arrangement of dielectric cylindrical sleeves.

31. The apparatus according to one of claims 25–28, wherein said plurality of said dielectric cylindrical sleeves each having an individual slotted electrostatic shield are arranged in immediate proximity to the rf applicator.

32. The apparatus of claim 1, wherein the rf power supply comprises:

a high-frequency power oscillator configured to output power at a fundamental frequency, said high frequency power oscillator comprising, at least one switching element having a control terminal configured to control current conduction between a pair of current conducting terminals, a reactive control network connected to said control terminal and configured to control instantaneous voltages on the control terminal, and at least one parasitic power dissipation mechanism configured to dissipate energy in a parasitic frequency; and a tank circuit encircling the plasma chamber, connected to the high-frequency power oscillator, and configured to resonate at the fundamental frequency, said tank circuit comprising, said rf applicator including at least one conductor which extends axially along at least a length of said plasma-forming region, and at least one tank capacitor connected in parallel with said at least one conductor.

33. The apparatus of claim 32, wherein said at least one parasitic power dissipation mechanism comprises:

a stainless steel shield enclosure surrounding the high frequency power oscillator and the tank circuit and configured to prevent broadcast of rf energy outside the plasma furnace and introduce sufficient resistance in the shield enclosure to dissipate energy for parasitic currents circulating in said shield enclosure.

34. The apparatus of claim 32, wherein said at least one parasitic power dissipation mechanism comprises:

a compacted coil located in the reactive control network and having sufficient distributed resistance to dissipate energy in the parasitic frequencies and a requisite reactance required by the reactive control network.

35. The apparatus of claim 33, wherein said at least one parasitic power dissipation mechanism comprises:

a compacted coil located in the reactive control network and having sufficient distributed resistance to dissipate energy in the parasitic frequencies and a requisite reactance required by the reactive control network.

36. The apparatus of claim 32, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

37. The apparatus of claim 33, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

38. The apparatus of claim 34, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

39. The apparatus of any one of claims 33–38, wherein the high frequency power oscillator comprises a push-pull vacuum tube oscillator circuit, the control terminal comprises a grid terminal of each vacuum tube in the push-pull oscillator circuit, and the reactive control circuit comprises a grid circuit connected between the grids of each vacuum tube and the electrical ground, said grid circuit is configured to control instantaneous voltages on the grids of each vacuum tube and to switch the vacuum tubes out-of-phase at the fundamental frequency.

40. The apparatus of claim 1, wherein the containment chamber comprises:

a penetration device configured to sample gas from various depths inside a storage container residing in the containment chamber, comprising, a flange configured to engage the storage container, a piercing tube connected to the flange and configured to pierce into the interior of the storage container, and an actuator configured to translate the flange and the piercing tube; and an effluent pipe coupling the interior of the piercing tube to the containment chamber outlet.

41. The apparatus of claim 40, wherein:

the containment chamber further comprises a heating mechanism configured to ramp application of energy to the hazardous waste material such that a vapor pressure of the pre-processed gas is maintained at the containment chamber outlet; and the penetration device includes temperature sensors mounted in the piercing tube and configured to measure temperature inside the storage container during the said ramping application of energy.

42. The apparatus of claim 41, comprising:

multiple containment chambers having respective containment chamber outlets connected to a common gas manifold configured to provide the pre-processed gas to the plasma furnace inlet.

43. The apparatus of claim 1, further comprising:

a capture facility coupled to the plasma furnace outlet and configured to store recombination products.

44. An apparatus for plasma disposal of hazardous waste, comprising:

containment chamber means for volatilizing at sub-atmospheric pressure hazardous waste material produce a pre-processed gas including hazardous waste reactants;

means for completely dissociating the hazardous waste reactants without circumvention in a plasma-forming region containing sufficient inductive energy such that said hazardous waste reactants transit through the plasma-forming region, are inductively coupled into a plasma having a plasma depth, and are dissociated;

means for recombining in a recombination region said dissociated hazardous waste reactant means exiting the plasma-forming region into recombination products, and means for removing recombination products from said recombination region.

45. The apparatus of claim 44, wherein the means for volatilizing comprises:

means for heating a storage container storing the hazardous waste material in stages such that a vapor pressure of the pre-processed gas is maintained; and means for measuring temperature inside the storage container.

46. The apparatus of claim 45, comprising:

means for piercing the hazardous waste material contained in the storage container and evacuating gas from various depths inside the storage container.

47. The apparatus of claim 46, wherein the means for volatilizing hazardous waste material comprises a plurality of containment chamber means having outputs coupled to a manifold which feeds the pre-processed gas to the dissociating means.

48. The apparatus of claim 44, wherein the means for dissociating comprises:

means for forming a vacuum annulus including the plasma-forming region and having a radial dimension equal to or less than a total distance of the plasma depth and a diffusion length of said pre-processed gas during transit of the pre-processed gas through the plasma-forming region.

49. The apparatus of claim 44, wherein the means for dissociating comprises:

means for forming a vacuum annulus including the plasma-forming region and having a radial dimension comparable to the plasma depth.

50. The apparatus of claim 44, wherein the means for dissociating comprises:

means for forming a cylindrical plasma-forming region having a diameter comparable to twice a total distance of the plasma depth and a diffusion length of said pre-processed gas means during transit through the plasma-forming region.

51. The apparatus of claim 44, wherein the means for dissociating comprises:

means for forming a cylindrical plasma-forming region having a diameter comparable to twice the plasma depth.

52. The apparatus of claim 44, wherein the means for recombining comprises:

means for controlling sub-atmospheric pressure in the recombination region such that dissociated hazardous waste reactants exiting the plasma-forming region diffuse to and quench on walls of the recombination region without reforming said hazardous waste reactants.

53. The apparatus of claim 52, comprising:

a vacuum pump configured to maintain a sub-atmospheric pressure below 20 Torr in said recombination region.

54. The apparatus of claim 44, wherein the means for dissociating comprises:

rf supply means for supplying rf power to said plasma-forming region, comprising, oscillator means for outputting power at a fundamental frequency, means for dissipating energy in parasitic frequencies in the oscillator means, and means for encircling said plasma-forming region with a tank circuit connected to the oscillator means and resonant at the fundamental frequency.

55. The apparatus of claim 54, wherein said rf supply means comprises a shield means for enclosing the oscillator means and the tank circuit and dissipating parasitic currents circulating in said shield means.

56. The apparatus of claim 54, wherein rf power supply means comprises:

a compacted coil located in a reactive control circuit of the oscillator means.

57. The apparatus of claim 56, wherein rf power supply means comprises:

means for quenching parasitic oscillations in the oscillator means, including a frequency-selective loss circuit connected between the reactive control circuit and an electrical ground.

58. A method for disposal of a hazardous waste, comprising:

volatilizing at sub-atmospheric pressure hazardous waste material in a containment chamber to produce a pre-processed gas including hazardous waste reactants;

dissociating completely the hazardous waste reactants from the containment chamber in a plasma-forming region containing sufficient inductive energy such that said hazardous waste reactants transit without circumvention through the plasma-forming region, are inductively coupled into a plasma having a plasma depth, and are completely dissociated;

recombining in a recombination region dissociated hazardous waste reactants exiting the plasma-forming region into recombination products, and removing recombination products from said recombination region.

59. The method of claim 58, wherein the step of volatilizing hazardous waste material comprises:

heating a storage container storing the hazardous waste material in stages such that a vapor pressure of the pre-processed gas is maintained; and measuring temperature inside the storage container.

60. The method of claim 59, further comprising the steps of:

elevating temperature in the containment chamber to 540 C.;

maintaining temperature in the containment chamber at 540 C. for at least 15 min;

cooling containment chamber to a safe temperature for handling; and removing residual material from containment chamber for disposal.

61. The method of claim 59, wherein the step of volatilizing comprises:

piercing the hazardous waste material contained in the storage container to evacuate gas from various depths inside the storage container.

62. The method of claim 55, wherein the step of volatilizing comprises:

volatilizing hazardous waste material contained in a plurality of containment chambers; and feeding the pre-processed gas produced in each containment chamber to the plasma forming region via a common manifold.

63. The method of claim 58, wherein the step of dissociating comprises the step of:

dissociating said hazardous waste reactants in a plasma-forming region with a vacuum annulus having a radial dimension equal to or less than to a total distance of the plasma depth and a diffusion length of said pre-processed gas during transit through the plasma-forming region.

64. The method of claim 58, wherein the step of dissociating comprises the step of:

dissociating said hazardous waste reactants in a plasma-forming region with a vacuum annulus having a radial dimension comparable to the plasma depth.

65. The method of claim 58, wherein the step of dissociating comprises the step of:

dissociating said hazardous waste reactants in a plasma-forming region with a cylindrical plasma-forming region having a diameter comparable to twice a total distance of the plasma depth and a diffusion length of said pre-processed gas during transit through the plasma-forming region.

66. The method of claim 58, wherein the step of dissociating comprises the step of:

dissociating hazardous waste reactants in a cylindrical plasma-forming region having a diameter comparable to twice the plasma depth.

67. The method of claim 58, wherein the step of recombining comprises:

maintaining sub-atmospheric pressure in the recombination region such that dissociated hazardous waste reactants exiting the plasma-forming region diffuse to and quench on walls of the recombination region without reforming said hazardous waste reactants.

68. The method of claim 58, wherein the step of recombining comprises:

maintaining sub-atmospheric pressure below 20 Torr in said recombination region.

69. The method of claim 58, wherein the step of dissociating comprises:

supplying rf power to said plasma-forming region with a rf power supply including a high frequency power oscillator and a tank circuit encircling the plasma-forming region, comprising, dissipating energy in parasitic frequencies in a reactive control network connected to the high frequency power oscillator.

70. The method of claim 69, wherein said step of supplying rf power comprises:

enclosing the high frequency power oscillator and the tank circuit with a shield enclosure with sufficient resistance to dissipate energy in parasitic frequencies for parasitic currents circulating in said shield enclosure.

71. The method of claim 69, wherein the step of supplying rf power comprises:

quenching parasitic oscillations in the rf supply with a compacted coil located in the reactive control network.

72. The method of claim 69, wherein the step of supplying rf power comprises:

quenching parasitic oscillations in the rf supply with a frequency-selective loss device connected between the reactive control network and an electrical ground.

73. An rf power supply apparatus, comprising:

a high-frequency power oscillator configured to output power at a fundamental frequency, said high frequency power oscillator comprising, at least one switching element having a control terminal configured to switch current conduction between current conduction terminals, a reactive control network connected to said control terminal and configured to control instantaneous voltages on the control terminal, and at least one parasitic power dissipation mechanism configured to dissipate energy in parasitic frequencies; and a tank circuit encircling the plasma chamber, connected to the high-frequency power oscillator, and configured to resonate at the fundamental frequency.

74. The apparatus of claim 73, wherein the rf power supply comprises:

a stainless steel shield enclosure surrounding the high frequency power oscillator and the tank circuit and configured to prevent broadcast of rf energy outside the plasma furnace.

75. The apparatus of claim 73, wherein said at least one parasitic power dissipation mechanism comprises:

a compacted coil located in the reactive control network and having sufficient distributed resistance to dissipate energy in the parasitic frequencies and a requisite reactance required by the reactive control network.

76. The apparatus of claim 74, wherein said at least one parasitic power dissipation mechanism comprises:

a compacted coil located in the reactive control network and having sufficient distributed resistance to dissipate energy in the parasitic frequencies and a requisite reactance required by the reactive control network.

77. The apparatus of claim 73, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

78. The apparatus of claim 74, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

79. The apparatus of claim 74, wherein said at least one parasitic power dissipation mechanism comprises:

a frequency-selective loss device connected between the reactive control circuit and an electrical ground, including at least one shunting capacitor connected in series with at least one resistor such that said energy in parasitic frequencies is capacitively shunted across the at least one capacitor and dissipated in the at least one resistor.

80. The apparatus of any one of claims 74–79, wherein:

the high frequency power oscillator comprises a push-pull vacuum tube oscillator circuit, the switching element comprises a grid of each vacuum tube in the push-pull oscillator circuit; and the reactive control circuit comprises a grid circuit connected between the grids of each vacuum tube and the electrical ground, said grid circuit is configured to control instantaneous voltages on the grids of each vacuum tube and to switch the vacuum tubes out-of-phase at the fundamental frequency.

81. An apparatus for plasma processing of gaseous materials, comprising:

a gas source configured to deliver at least one process gas to the plasma processing apparatus;

a plasma chamber coupled to the gas source, including a plasma-forming region in which a plasma-forming magnetic field is produced, said at least one process gas passing without circumvention through the plasma-forming region;

an rf power supply including an rf applicator configured to produce a plasma-forming magnetic field of sufficient inductive energy into said plasma-forming region such that said at least one process gas during transit through the plasma-forming region is inductively coupled into a plasma and is completely reacted; and a vacuum pump connected to the chamber outlet and configured to maintain a process pressure in the plasma chamber.

82. The apparatus of claim 81, further comprising:

a recombination region coupled to said plasma forming region in which products from the plasma-forming region recombine into recombination products upon exiting the plasma-forming region.

83. The apparatus of claim 81, wherein the process gas is introduced into the plasma-forming region.

84. The apparatus according to claim 83, wherein the process gas is reacted in the plasma-forming region and the recombination produces material powders.

85. The apparatus according to claim 84, wherein the gas source supplies mixtures of silicon-bearing and carbon-bearing gases which react to form SiC powder.

86. The apparatus according to claim 85, wherein the gas source supplies mixtures of silane and methane which react to form SiC powder.

87. The apparatus according to claim 84, comprising a silicon powder source which introduces silicon powder to the plasma-forming region, said gas source introducing a carbon-bearing to the plasma-forming region to react with the silicon powder to form SiC powder.

88. The apparatus according to claim 84, wherein the gas source supplies mixtures of an aluminum-bearing gas and oxygen which react to form $Al_2O_3$ powder.

89. The apparatus according to claim 87, wherein the gas source supplies mixtures of trimethyl aluminum and oxygen which react to form $Al_2O_3$ powder.

90. The apparatus according to claim 84, wherein the gas source supplies mixtures of an aluminum-bearing gas and at least one of $N_2$ and $NH_3$, which react to form AlN powder.

91. The apparatus according to claim 89, wherein the gas source supplies mixtures of trimethyl aluminum and at least one of $N_2$ and $NH_3$ which react to form AlN powder.

92. The apparatus according to claim 84, wherein the gas source supplies mixtures of carbonyls and hydrides of the elemental magnetic materials which react to form magnetic powder.

* * * * *